United States Patent
Park et al.

(10) Patent No.: US 11,316,626 B2
(45) Date of Patent: Apr. 26, 2022

(54) METHOD AND APPARATUS FOR TRANSMITTING AND RECEIVING CONTROL INFORMATION IN WIRELESS COMMUNICATION SYSTEM

(71) Applicant: Samsung Electronics Co., Ltd., Gyeonggi-do (KR)

(72) Inventors: Sung-jin Park, Incheon (KR); Jeong-ho Yeo, Gyeonggi-do (KR); Jin-young Oh, Seoul (KR); Ju-ho Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 99 days.

(21) Appl. No.: 16/645,321

(22) PCT Filed: Sep. 21, 2018

(86) PCT No.: PCT/KR2018/011210
§ 371 (c)(1),
(2) Date: Mar. 6, 2020

(87) PCT Pub. No.: WO2019/059700
PCT Pub. Date: Mar. 28, 2019

(65) Prior Publication Data
US 2021/0014012 A1    Jan. 14, 2021

(30) Foreign Application Priority Data
Sep. 21, 2017  (KR) .................. 10-2017-0121871

(51) Int. Cl.
*H04L 1/18*    (2006.01)
*H04L 5/00*    (2006.01)
*H04L 5/10*    (2006.01)

(52) U.S. Cl.
CPC .......... *H04L 1/1854* (2013.01); *H04L 1/1819* (2013.01); *H04L 1/1896* (2013.01);
(Continued)

(58) Field of Classification Search
CPC ... H04L 1/1854; H04L 1/1819; H04L 1/1896; H04L 5/0051; H04L 5/0055; H04L 5/10;
(Continued)

(56) References Cited

U.S. PATENT DOCUMENTS

2018/0035332 A1* 2/2018 Agiwal ............. H04W 74/0858
2019/0363833 A1* 11/2019 Wang ..................... H04L 1/189
2021/0168836 A1* 6/2021 Takeda .................. H04L 1/1835

FOREIGN PATENT DOCUMENTS

WO    WO 2017/150855    9/2017

OTHER PUBLICATIONS

Samsung, "DL Resource Allocation for Multiplexing Data with Different Transmissions Durations", R1-1710737, 3GPP TSG RAN WG1 Meeting NR Ad Hoc #2, Jun. 27-30, 2017, 4 pages.
(Continued)

*Primary Examiner* — Shukri Taha
(74) *Attorney, Agent, or Firm* — The Farrell Law Firm, P.C.

(57) ABSTRACT

Provided are a method and apparatus for transmitting and receiving control information in a wireless communication system, wherein the method, performed by a terminal, of transmitting and receiving control information according to an embodiment includes: receiving first type data; receiving second type data assigned to at least a part of a resource region assigned to the first type data; receiving an interruption indicator; and performing a hybrid automatic repeat request (HARQ) acknowledgement (ACK)/negative ACK (NACK) transmission regarding the first type data based on the interruption indicator.

18 Claims, 9 Drawing Sheets

(52) U.S. Cl.
CPC .......... *H04L 5/0051* (2013.01); *H04L 5/0055* (2013.01); *H04L 5/10* (2013.01)

(58) Field of Classification Search
CPC .. H04W 72/042; H04W 72/37; H04W 72/455
See application file for complete search history.

(56) References Cited

OTHER PUBLICATIONS

Sony, "Remaining Issues on Using Pre-emption Indicator for DL URLLC/eMBB Multiplexing", R1-1710865, 3GPP TSG RAN WG1 NR Ad-Hoc#2, Jun. 27-30, 2017, 9 pages.
NTT Docomo, Inc., "Pre-emption Indication for Downlink", R1-1713960, 3GPP TSG RAN WG1 Meeting #90, Aug. 21-25, 2017, 3 pages.
European Search Report dated Aug. 3, 2020 issued in counterpart application No. 18858420.5-1205, 10 pages.
Sony, "On Transmission of Pre-emption Indicator using Group Common DCI", R1-1712976, 3GPP TSG RAN WG1 Meeting #90, Aug. 21-25, 2017, 7 pages.
Qualcomm Incorporated, "URLLC DL Pre-emption and UL Suspension Indication Channel Design", R1-1713452, 3GPP TSG RAN WG1 Meeting #90, Aug. 21-25, 2017, 9 pages.
Sequans Communications, "Considerations on Preemption Indication for DL", R1-1714085, 3GPP TSG RAN WG1 Meeting #90, Aug. 21-25, 2017, 5 pages.
Samsung, "Indication of Pre-empted Resources Prior to HARQ-ACK Feedback", R1-1711457, 3GPP TSG RAN WG1 Meeting NR Ad Hoc #2, Jun. 27-30, 2017, 5 pages.
International Search Report dated Jan. 4, 2019 issued in counterpart application No. PCT/KR2018/011210, 18 pages.
Intel Corporation, "Indication of Preemption of DL Transmissions", R1-1707414, 3GPP TSG RAN WG1 Meeting #89, May 15-19, 2017, 6 pages.
Wilus Inc., "Discussion on UE Behavior by Pre-emption Indication", R1-1716636, 3GPP TSG RAN WG1 Meeting NR#3, Sep. 18-21, 2017, 5 pages.
Korean Office Action dated Feb. 18, 2022 issued in counterpart application No. 10-2017-0121871, 10 pages.

* cited by examiner

METHOD AND APPARATUS FOR TRANSMITTING AND RECEIVING CONTROL INFORMATION IN WIRELESS COMMUNICATION SYSTEM

PRIORITY

This application is a National Phase Entry of PCT International Application No. PCT/KR2018/011210 which was filed on Sep. 21, 2018, and claims priority to Korean Patent Application No. 10-2017-0121871, which was filed on Sep. 21, 2017, the content of each of which is incorporated herein by reference.

TECHNICAL FIELD

The present disclosure relates to a wireless communication system and to a method and apparatus for smoothly providing a service. More particularly, the present disclosure relates to a method and apparatus for transmitting and receiving control information in a wireless communication system.

BACKGROUND ART

To meet the increase in demand for wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.'

In order to achieve a high data transmission rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (MIMO), Full Dimensional MIMO (FD-MIMO), array antennas, analog beam-forming, and large-scale antennas.

In order to improve system networks for 5G communication systems, various technologies have been developed, e.g., evolved small cells, advanced small cells, cloud radio access networks (Cloud-RAN), ultra-dense networks, Device-to-Device communication (D2D), wireless backhaul, moving networks, cooperative communication, Coordinated Multi-Points (CoMP), and interference cancellation.

Also, for 5G communication systems, other technologies have been developed, e.g., hybrid frequency-shift keying (FSK) and quadrature amplitude modulation (QAM) (FQAM) and Sliding Window Superposition Coding (SWSC), which are Advanced Coding Modulation (ACM) schemes, and Filter Bank Multi Carrier (FBMC), non-orthogonal multiple access (NOMA) and sparse code multiple access (SCMA), which are advanced access schemes.

The Internet has evolved from a human-based connection network, where humans create and consume information, to the Internet of Things (IoT), where distributed configurations, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, Machine to Machine (M2M) communication, Machine Type Communication (MTC), etc. have been studied. In the IoT environment, intelligent Internet Technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

As described above, various services may be provided due to the development of wireless communication systems, and thus there is need for methods of smoothly providing such services.

DESCRIPTION OF EMBODIMENTS

Technical Problem

Provided are a method and apparatus for transmitting and receiving control information to effectively provide a plurality of services, when different types or the same type of services coexist in a wireless communication system.

Also, provided are a method and apparatus for transmitting and receiving control information to effectively perform channel estimation.

Solution to Problem

According to an embodiment, a method, performed by a terminal, of transmitting and receiving control information in a wireless communication system includes: receiving first type data; receiving second type data assigned to at least a part of a resource region assigned to the first type data; receiving an interruption indicator; and performing a hybrid automatic repeat request (HARQ) acknowledgement (ACK)/negative ACK (NACK) transmission regarding the first type data, based on the interruption indicator.

Advantageous Effects of Disclosure

According to embodiments, a plurality of services can be effectively provided when different types or the same type of services coexist in a wireless communication system.

Also, according to embodiments, channel estimation can be effectively performed.

BEST MODE

Figure 1:
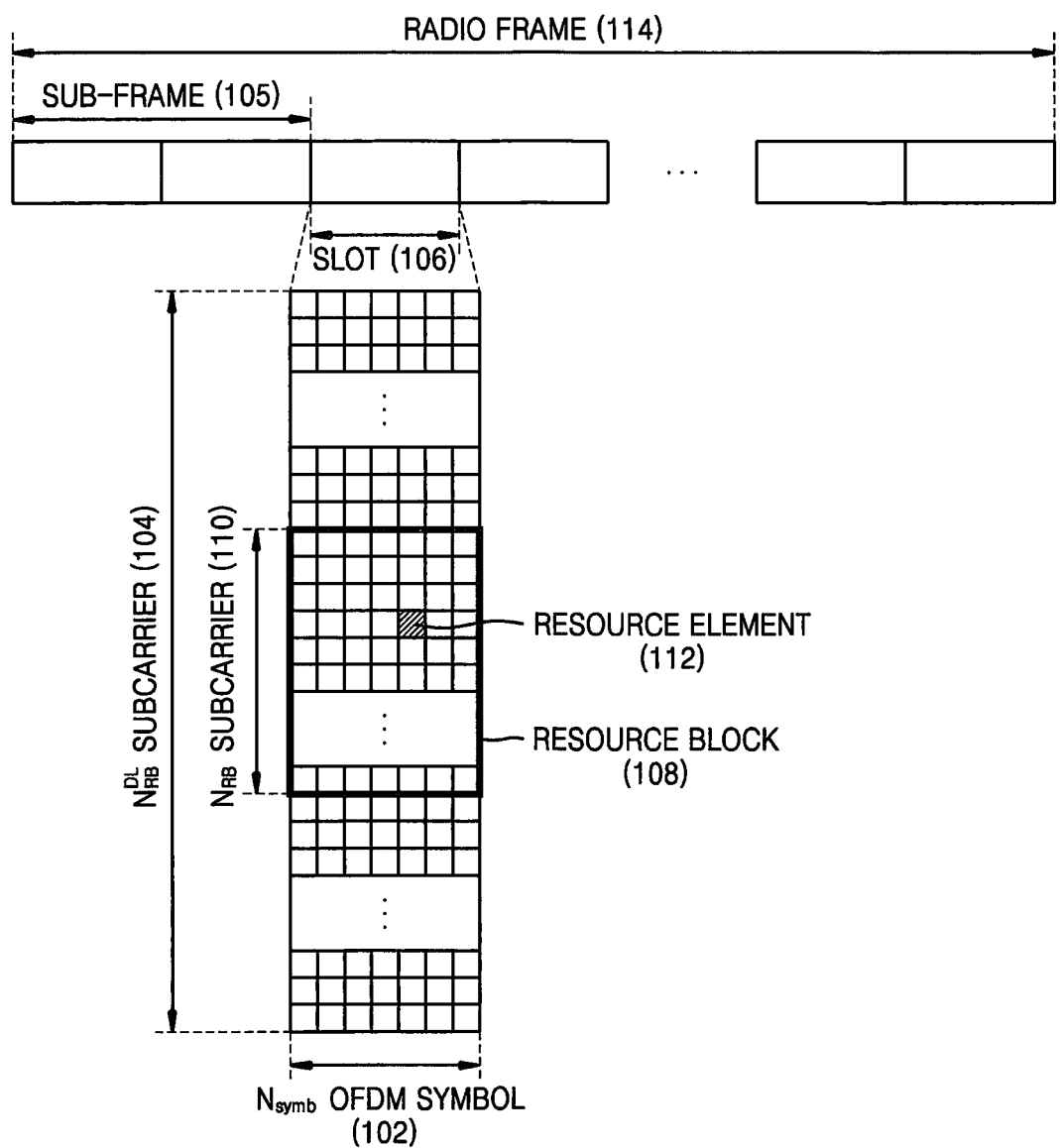
FIG. 1 is a diagram showing a basic structure of a time-frequency resource region that is a radio resource region of a wireless communication system based on cyclic prefix orthogonal frequency division multiplexing (CP-OFDM).

According to an embodiment, a method, performed by a terminal, of transmitting and receiving control information in a wireless communication system includes: receiving first type data; receiving second type data assigned to at least a part of a resource region assigned to the first type data; receiving an interruption indicator; and performing a hybrid automatic repeat request (HARQ) acknowledgement (ACK)/negative ACK (NACK) transmission regarding the first type data, based on the interruption indicator.

The performing of the HARQ ACK/NACK transmission may include determining the HARQ ACK/NACK transmission regarding the first type data based on a reception time of the interruption indicator, and the reception time of the interruption indicator may include at least one of a time when a resource region including the interruption indicator starts to be received and a time when reception is ended.

The performing of the HARQ ACK/NACK transmission may further include determining the HARQ ACK/NACK transmission regarding the first type data based on at least one of a reception time of the first type data, a reception time of the second type data, and a transmission time of HARQ ACK/NACK, wherein the reception time of the first type data may include at least one of a time when a resource region to which the first type data is assigned starts to be received and a time when reception is ended, the reception time of the second type data may include at least one of a time when a resource region to which the second type data is assigned starts to be received and a time when reception is ended, and the transmission time of the HARQ ACK/NACK may include at least one of a time when a resource region to which the HARQ ACK/NACK is assigned starts to be transmitted and a time when transmission is ended.

The performing of the HARQ ACK/NACK transmission may further include determining the HARQ ACK/NACK transmission regarding the first type data based on a time difference between the reception time of the interruption indicator and at least one of the reception time of the first type data, the reception time of the second type data, and the transmission time of the HARQ ACK/NACK.

The resource region to which the first type data is assigned may include at least one code block, and the performing of the HARQ ACK/NACK transmission may further include performing the HARQ ACK/NACK transmission in units of the at least one code block.

The reception time of the first type data may include at least one of a time when a resource to which the at least one code block is assigned starts to be received and a time when reception is ended.

The performing of the HARQ ACK/NACK transmission may include changing a pre-configured HARQ ACK/NACK transmission resource to a new HARQ ACK/NACK transmission resource.

The performing of the HARQ ACK/NACK transmission may further include: determining whether an interruption regarding the first type data is generated, based on the interruption indicator; and when the interruption regarding the first type data is generated, determining to change the pre-configured HARQ ACK/NACK transmission resource to the new HARQ ACK/NACK transmission resource.

The performing of the HARQ ACK/NACK transmission may further include determining to change the pre-configured HARQ ACK/NACK transmission resource to the new HARQ ACK/NACK transmission resource at at least one of when a time difference between a reception time of the interruption indicator and at least one of a reception time of the first type data, a reception time of the second type data, and a transmission time of HARQ ACK/NACK is equal to or greater than a threshold value, when a resource to which at least one code block included in the first type data is assigned is interrupted by a certain ratio or more, and when a resource to which a demodulation reference signal (DMRS) for demodulation of the first type data is assigned is interrupted.

The new HARQ ACK/NACK transmission resource may include a time resource different from the pre-configured HARQ ACK/NACK transmission resource.

According to another embodiment, a terminal for transmitting and receiving control information in a wireless communication system includes: a communicator configured to communicate with a base station; and a processor configured to receive first type data, receive second type data assigned to at least a part of a resource region assigned to the first type data, receive an interruption indicator, and perform a hybrid automatic repeat request (HARQ) acknowledgement (ACK)/negative ACK (NACK) transmission regarding the first type data based on the interruption indicator.

The processor may be further configured to determine the HARQ ACK/NACK transmission regarding the first type data based on a reception time of the interruption indicator, wherein the reception time of the interruption indicator may include at least one of a time when a resource region including the interruption indicator starts to be received and a time when reception is ended.

The processor may be further configured to determine the HARQ ACK/NACK transmission regarding the first type data based on at least one of a reception time of the first type data, a reception time of the second type data, and a transmission time of HARQ ACK/NACK, wherein the reception time of the first type data may include at least one of a time when a resource region to which the first type data is assigned starts to be received and a time when reception is ended, the reception time of the second type data may include at least one of a time when a resource region to which the second type data is assigned starts to be received and a time when reception is ended, and the transmission time of the HARQ ACK/NACK may include at least one of a time when a resource region to which the HARQ ACK/NACK is assigned starts to be transmitted and a time when transmission is ended.

The processor may be further configured to determine the HARQ ACK/NACK transmission regarding the first type data based on a time difference between the reception time of the interruption indicator and at least one of the reception time of the first type data, the reception time of the second type data, and the transmission time of the HARQ ACK/NACK.

The resource region to which the first type data is assigned may include at least one code block, and the processor may be further configured to perform the HARQ ACK/NACK transmission in units of the at least one code block.

The reception time of the first type data may include at least one of a time when a resource to which the at least one code block is assigned starts to be received and a time when reception is ended.

The processor may be further configured to change a pre-configured HARQ ACK/NACK transmission resource to a new HARQ ACK/NACK transmission resource.

The processor may be further configured to determine whether an interruption regarding the first type data is generated, based on the interruption indicator; and when the interruption regarding the first type data is generated, determine to change the pre-configured HARQ ACK/NACK transmission resource to the new HARQ ACK/NACK transmission resource.

The processor may be further configured to determine to change the pre-configured HARQ ACK/NACK transmission resource to the new HARQ ACK/NACK transmission resource at at least one of when a time difference between a reception time of the interruption indicator and at least one of a reception time of the first type data, a reception time of the second type data, and a transmission time of HARQ ACK/NACK is equal to or greater than a threshold value, when a resource to which at least one code block included in the first type data is assigned is interrupted by a certain ratio or more, and when a resource to which a demodulation reference signal (DMRS) for demodulation of the first type data is assigned is interrupted.

The new HARQ ACK/NACK transmission resource may include a time resource different from the pre-configured HARQ ACK/NACK transmission resource.

According to another embodiment, a method, performed by a terminal, of transmitting and receiving control information in a wireless communication system includes: scheduling a resource for channel estimation; receiving a reference signal; receiving second type data assigned to at least a part of a resource region assigned to the reference signal; receiving an interruption indicator; and performing a channel estimation result reporting operation based on the interruption indicator.

MODE OF DISCLOSURE

Hereinafter, embodiments of the present disclosure will be described with reference to accompanying drawings.

In describing the embodiments, descriptions of technical contents that are well known in the technical field to which the disclosure belongs and are not directly related to the disclosure will be omitted. By omitting the unnecessary description, the gist of the disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of the disclosure and methods of accomplishing the same may be understood more readily by reference to the following detailed description of the embodiments and the accompanying drawings. In this regard, the embodiments of the disclosure may have different forms and should not be construed as being limited to the descriptions set forth herein. Rather, these embodiments are provided so that this disclosure will be thorough and complete and will fully convey the concept of the disclosure to one of ordinary skill in the art, and the disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments means a software component or hardware component such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like. Also, a $5^{th}$ generation (5G) or new radio (NR) communication standards are being developed with 5G wireless communication systems.

In the 5G wireless communication systems, at least one service among Enhanced Mobile BroadBand (eMBB), massive Machine Type Communications (mMTC), and Ultra-Reliable and Low-Latency Communications (URLLC) may be provided to a terminal. These services may be provided to the same terminal or to different terminals during the same time interval. In an embodiment, eMBB may be a service aiming at high-speed transmission of high capacity data, mMTC may be a service aiming at terminal power minimization and multiple terminal connections, and URLLC may be a service aiming at high reliability and low delay, but are not limited thereto. In addition, such services may be a major scenario in an LTE system or in a system such as 5G/NR (new radio, next radio) after LTE. In an embodiment, a method for coexistence of at least two services among eMBB, mMTC, and URLLC and an apparatus using the method are described.

A base station may schedule eMBB data corresponding to an eMBB service to a specific terminal in a transmission time interval (TTI). At this time, when a situation occurs in which URLLC data corresponding to a URLLC service needs be transmitted in the TTI, the URLLC data may be transmitted without transmitting a part of the eMBB data in a frequency band in which the eMBB data is already scheduled and transmitted. Here, a terminal scheduled for the eMBB data and a terminal scheduled for the URLLC data may be the same terminal or may be different terminals. In such a case, there occurs an interval in which a part of the eMBB data that has already been scheduled and transmitted is not transmitted, and thus a possibility that the eMBB data may be damaged increases. Accordingly, there is a need for a method of receiving a signal from the terminal scheduled for the eMBB data or the terminal scheduled for the URLLC data, and a method of processing a received signal.

In one or more embodiments, a method and apparatus capable of transmitting information according to each service when information according to different services are simultaneously scheduled by sharing some or all frequency bands will be described. For example, a method and apparatus capable of transmitting information according to each service when pieces of information according to an eMBB service and a URLLC service are scheduled in the same transmission time interval, when pieces of information according to an mMTC service and a URLLC service are scheduled in the same transmission time interval, when pieces of information according to an mMTC service and an eMBB service are scheduled in the same transmission time interval, or when pieces of information according to an eMBB service, a URLLC service, and an mMTC service are scheduled in the same transmission time interval will be described.

Hereinafter, embodiments of the present disclosure will be described with reference to accompanying drawings. While describing the present disclosure, detailed description of related well-known functions or configurations may be omitted when it is deemed that they may unnecessarily obscure the essence of the present disclosure. Also, terms used below are defined in consideration of functions in the present disclosure, and may have different meanings according to an intention of a user or operator, customs, or the like. Thus, the terms should be defined based on the description throughout the specification. Hereinafter, a base station is an entity that assigns resources of a terminal, and may be at least one of a gNode B (gNB), an eNode B (eNB), a Node B (NB), a base station (BS), a wireless access unit, a BS controller, or a node on a network. Examples of a terminal may include user equipment (UE), a mobile station (MS), a cellular phone, a smartphone, a computer, and a multimedia system capable of performing a communication function. In the present disclosure, a downlink (DL) is a wireless transmission path of a signal transmitted from a base station to a terminal, and an uplink (UL) is a wireless transmission path of a signal transmitted from a terminal to a base station. Also, hereinbelow, one or more embodiments of the present disclosure will be described as an example of an LTE or LTE-A system, but the one or more embodiments may also be applied to other communication systems having a similar technical background or channel form. For example, 5G mobile communication technology (5G, new radio, NR) developed after LTE-A may be included. Also, it will be understood by one of ordinary skill in the art that embodiments of the present disclosure may be applied to other communication systems through some modifications without departing from the scope of the present disclosure.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal, a UE, or a MS transmits data or control signals to a BS or a gNode B, and the DL refers to a radio link through which a BS transmits data or control signals to a terminal. In such a multiple access scheme, data or control information of each user is classified by generally assigning and operating the data or control information such that time-frequency resources for transmitting data or control information for each user do not overlap each other, that is, such that orthogonality is established.

An LTE system employs an HARQ scheme in which a physical layer retransmits data when a decoding failure occurs in initial transmission. In the HARQ scheme, when a receiver fails to accurately decode data, the receiver transmits information (Negative Acknowledgment (NACK)) indicating the decoding failure to the transmitter so that the transmitter may retransmit the corresponding data in the physical layer. The receiver combines the data retransmitted by the transmitter with the data whose previous decoding had failed so as to improve data reception performance. In addition, when the receiver accurately decodes the data, information (acknowledgment (ACK)) indicating successful decoding is transmitted to the transmitter so that the transmitter may transmit new data.

FIG. 1 is a diagram showing a basic structure of a time-frequency resource region that is a radio resource region of a wireless communication system based on a cyclic prefix orthogonal frequency division multiplexing (CP-OFDM).

In FIG. 1, a horizontal axis represents a time domain and a vertical axis represents a frequency domain in a radio resource region. In the time domain, the minimum transmission unit is an OFDM symbol, and $N_{symb}$ OFDM symbols 102 are gathered to constitute one slot 106, and two slots are gathered to constitute one sub-frame 105. The length of the slot is 0.5 ms, and the length of the sub-frame is 1.0 ms. Further, a radio frame 114 is a time domain interval composed of 10 sub-frames. The minimum transmission unit in the frequency domain is a subcarrier, and the transmission bandwidth of the whole system is composed of $N_{RB}^{DL}$ subcarriers 104 in total.

However, such specific numerical values may vary according to a system. For example, in a 5G or NR system, a slot and a mini-slot (or non-slot) may support two types of slot structure. In a slot of 5G or NR system, $N_{symb}$ may be configured to a value among 7 and 14, and in a mini-slot of 5G or NR system, $N_{symb}$ may be configured to a value among 1 to 7.

In the time-frequency domain, a basic unit of a resource is a resource element (RE) 112, and may be indicated as an OFDM symbol index and a subcarrier index. A resource block (RB) 108 or a physical resource block (PRB) is defined as $N_{symb}$ successive OFDM symbols 102 in the time domain and $N_{RB}$ successive subcarriers 110 in the frequency domain. Accordingly, one RB 108 is composed of $N_{symb} \times N_{RB}$ REs 112 in one slot.

In general, the frequency domain minimum assignment unit of data is RB, and in the LTE system, it is general that $N_{symb}$ is 7 and $N_{RB}$ is 2, and $N_{BW}$ and $N_{RB}$ are in proportion to the system transmission bandwidth. A data rate is increased in proportion to the number of RBs being scheduled.

In the LTE system, 6 transmission bandwidths may be defined and operated. In the case of a frequency division duplex (FDD) system that divides and operates a downlink and an uplink through a frequency, the transmission bandwidth of the downlink and the transmission bandwidth of the uplink may differ from each other. Here, a channel bandwidth indicates a radio frequency (RF) bandwidth that corresponds to the system transmission bandwidth. Table 1 presents a corresponding relationship between the system transmission bandwidth defined in the LTE system and the channel bandwidth. For example, in the LTE system having the channel bandwidth of 10 MHz, the transmission bandwidth is composed of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information may be transmitted within first N OFDM symbols in a sub-frame. According to an embodiment, N={1, 2, 3} in general. Accordingly, in accordance with the amount of control information to be transmitted n a current sub-frame, the value N may be varied for each sub-frame. The control information may include a control channel transmission interval indicator indicating how many OFDM symbols the control information is transmitted through, scheduling information on downlink data or uplink data, and a HARQ ACK/NACK signal. In the LTE system, the scheduling information on the downlink data or the uplink data is transferred from a base station to a terminal through downlink control information (DCI). The DCI is defined according to various formats, and may indicate, according to each format, whether the scheduling information is uplink data scheduling information (UL grant) or downlink data scheduling information (DL grant), whether the DCI is compact DCI having a small size of control information, whether spatial multiplexing using multiple antennas is applied, or whether the DCI is DCI for controlling power. For example, DCI format 1 that is the scheduling control information (DL grant) of the downlink data may include at least the following control information.

Resource allocation type 0/1 flag: Indicates whether a resource allocation type is type 0 or type 1. The type 0 allocates resources in units of a resource block group (RBG) through applying of a bitmap type. In the LTE system, a basic unit of scheduling is RB that is expressed as a time and frequency domain resource, and the RBG is composed of a plurality of RBs to be considered as the basic unit of scheduling in the type 0. The type 1 allocates a specific RB in the RBG.

Resource block assignment: Indicates RB that is allocated for data transmission. An expressed resource is determined in accordance with a system bandwidth and a resource allocation method.

Modulation and coding scheme (MCS): Indicates a modulation method used for data transmission and the size of a transport block (TB) that is data to be transmitted.

HARQ process number: Indicates a process number of HARQ.

New data indicator: Indicates whether HARQ transmission is initial transmission or retransmission.

Redundancy version: Indicates a redundancy version of HARQ.

Transmit power control (TPC) command for physical uplink control channel (PUCCH): Indicates a transmission power control command for a PUCCH that is an uplink control channel.

The DCI may be transmitted through a physical downlink control channel (PDCCH) (or control information, hereinafter, mixedly used) that is a downlink physical control channel or an enhanced PDCCH (EPDCCH) (or enhanced control information, hereinafter, mixedly used) after passing through a channel coding and modulation process.

In general, the DCI is scrambled by a specific radio network temporary identifier (RNTI) (or terminal identifier) independently with respect to each terminal, is added with a cyclic redundancy check (CRC), is channel-coded, and then is configured as an independent PDCCH to be transmitted. In the time domain, the PDCCH is mapped and transmitted for the control channel transmission interval. A mapping location of the PDCCH in the frequency domain is determined by the identifier (ID) of each terminal, and the PDCCH may be transmitted through the transmission band of the whole system.

The downlink data may be transmitted through a physical downlink shared channel (PDSCH) that is a physical channel for transmitting the downlink data. The PDSCH may be transmitted after the control channel transmission interval, and scheduling information, such as a concrete mapping location or a modulation method in the frequency domain, may be determined based on the DCI to be transmitted through the PDCCH.

The base station notifies the terminal of a modulation method applied to the PDSCH to be transmitted and a transport block size (TBS) to be transmitted, by using an MCS among the control information constituting the DCI. According to an embodiment, the MCS may be composed of 5 bits, or may be composed of less than or more than 5 bits. The TBS corresponds to the size before channel coding for error correction is applied to the transport block (TB) to be transmitted by the base station.

The modulation method supported in the LTE system is quadrature phase shift keying (QPSK), 16 quadrature amplitude modulation (16 QAM), or 64 QAM, and respective modulation orders ($Q_m$) correspond to 2, 4, and 6. That is, in the case of the QPSK modulation, 2 bits per symbol may be transmitted, in the case of the 16 QAM modulation, 4 bits per symbol may be transmitted, and in the case of the 64 QAM modulation, 6 bits per symbol may be transmitted. Also, a modulation method of 256 QAM or more may be used according to system modification.

Figure 2:
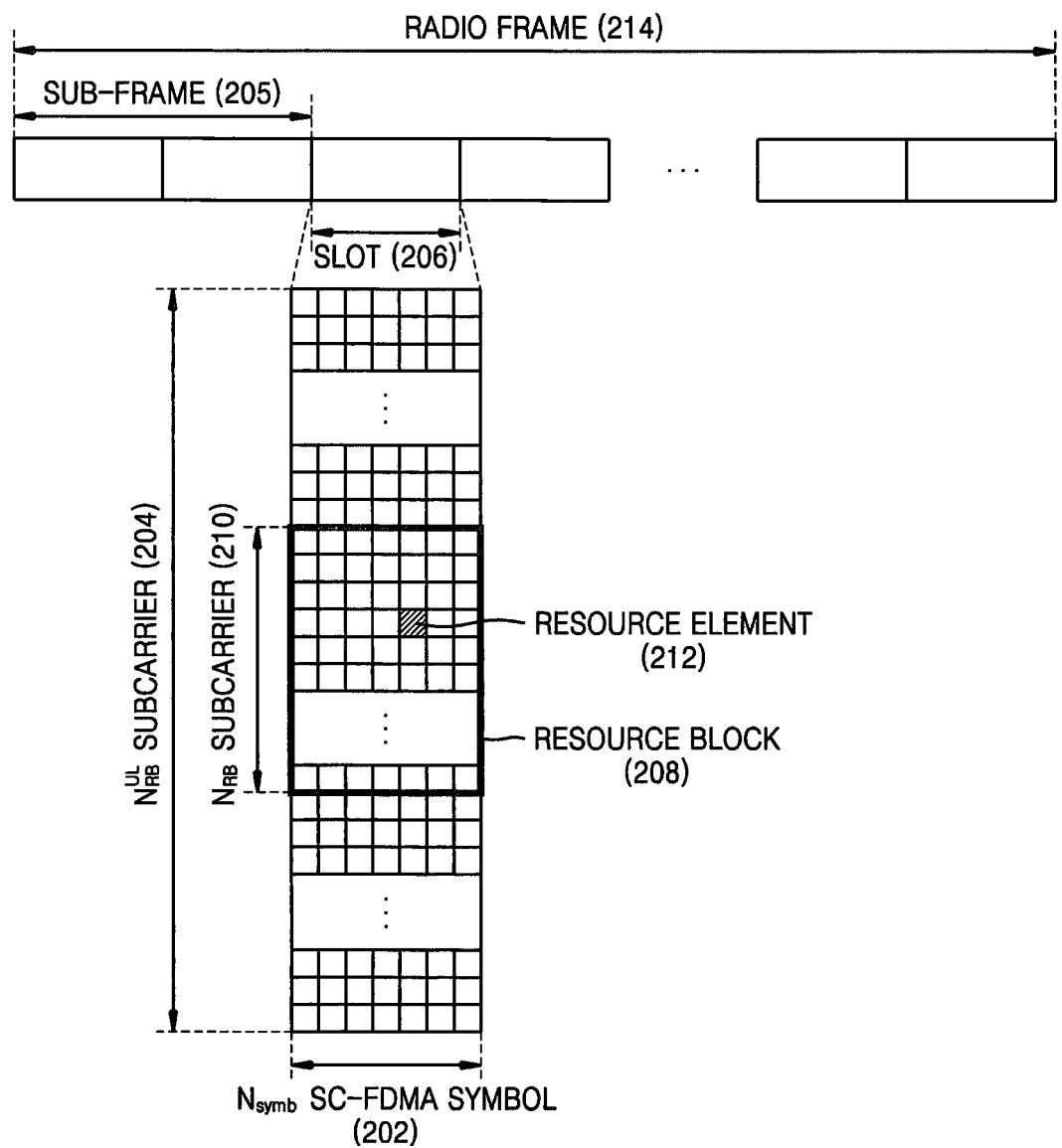
FIG. 2 is a diagram showing a basic structure of a time-frequency resource region that is a radio resource region of a wireless communication system based on single carrier frequency division multiple access (SC-FDMA).

FIG. 2 is a diagram showing a basic structure of a time-frequency resource region that is a radio resource region of a wireless communication system based on single carrier frequency division multiple access (SC-FDMA).

In FIG. 2, a horizontal axis represents a time domain and a vertical axis represents a frequency domain in a radio resource region. In the time domain, the minimum transmission unit in a time domain is a SC-FDMA symbol 202, and $N_{symb}^{UL}$ SC-FDMA symbols are gathered to constitute one slot 206. Further, two slots are gathered to constitute one sub-frame 205. The minimum transmission unit in the frequency domain is a subcarrier, and a transmission bandwidth of the whole system is composed of $N_{RB}^{UL}$ subcarriers 204 in total. The subcarriers 204 may have a value in proportion to a system transmission bandwidth.

In the time-frequency domain, a basic unit of a resource is a resource element (RE) 212, and may be defined as an SC-FDMA symbol index and a subcarrier index. A resource block (RB) pair 208 is defined as $N_{symb}$ successive SC-FDMA symbols in the time domain and $N_{RB}$ successive subcarriers in the frequency domain. Accordingly, one RB is composed of $N_{symb} \times N_{RB}$ REs. In general, the minimum transmission unit of data or control information is an RB unit. A PUCCH may be mapped on the frequency domain corresponding to 1 RB, and transmitted for one sub-frame.

In the LTE system, the timing relationship between a PDSCH that is a physical channel for transmitting downlink data or a PDCCH/EPDDCH including a semi-persistent scheduling (SPS) release and an uplink physical channel (PUCCH or PUSCH) through which a corresponding HARQ ACK/NACK is transmitted may be defined. As an example, in the LTE system that operates as a frequency division duplex (FDD), the HARQ ACK/NACK corresponding to the PDSCH transmitted in the (n−4)-th sub-frame or the PDCCH/EPDCCH including the SPS release is transmitted by the PUCCH or PUSCH in the n-th subframe.

In the LTE system, a downlink HARQ adapts an asynchronous HARQ method in which data re-transmission time is not fixed. That is, if the HARQ NACK is fed back from the terminal with respect to the initially transmitted data transmitted by the base station, the base station freely determines the transmission time of re-transmitted data through the scheduling operation. The terminal buffers the data that is determined as an error as the result of decoding the received data for the HARQ operation, and then performs combining with the next re-transmitted data.

When PDSCH including downlink data transmitted from the base station in a sub-frame n is received, the terminal transmits uplink control information including HARQ ACK or NACK of the downlink data to the base station through PUCCH or PUSCH in a sub-frame n+k. Here, k may be differently defined in accordance with FDD or time division duplex (TDD) of the LTE system and a sub-frame configuration. As an example, in an FDD LTE system, k is fixed to 4. On the other hand, in a TDD LTE system, k may be changed in accordance with the sub-frame configuration and a sub-frame number. Further, during data transmission through a plurality of carriers, the value of k may be differently applied in accordance with a TDD configuration of each carrier.

In the LTE system, in contrast to downlink HARQ, uplink HARQ adapts a synchronous HARQ method in which data transmission time is fixed. That is, an uplink/downlink timing relationship among a physical uplink shared channel (PUSCH) that is a physical channel for transmitting the uplink data, a PDCCH that is a preceding downlink control channel, and a physical hybrid indicator channel (PHICH) that is a physical channel through which the downlink HARQ ACK/NACK corresponding to the PUSCH is transmitted may be fixed by a following rule.

When the PDCCH including uplink scheduling control information transmitted from the base station in the sub-frame n or the PHICH through which the downlink HARQ ACK/NACK is transmitted is received, the terminal transmits the uplink data corresponding to the control information through the PUSCH in the sub-frame n+k. Here, k may be differently defined in accordance with the FDD or TDD of the LTE system and its configuration. As an example, in the FDD LTE system, k is fixed to 4. On the other hand, in the TDD LTE system, k may be changed in accordance with the sub-frame configuration and the sub-frame number. Further, during data transmission through a plurality of carriers, the value of k may be differently applied in accordance with a TDD configuration of each carrier.

Further, when the terminal receives the PHICH that carries the downlink HARQ ACK/NACK from the base station in a sub-frame i, the PHICH corresponds to the PUSCH transmitted by the terminal in a sub-frame i-k. Here, k is differently defined in accordance with the FDD or TDD of the LTE system and its configuration. As an example, in an FDD LTE system, k is fixed to 4. On the other hand, in the TDD LTE system, k may be changed in accordance with the sub-frame configuration and the sub-frame number. Further, during data transmission through a plurality of carriers, the value of k may be differently applied in accordance with a TDD configuration of each carrier.

TABLE 2

PDCCH and PDSCH configured by C-RNTI

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing for Transmit diversity |
| Mode 5 | DCI format 1A | Common and UE specific by C-RNTI | Transmit diversity |
| | DCI format 1D | UE specific by C-RNTI | Multi-user MIMO |
| Mode 6 | DCI format 1A | Common and UE specific by C-RNTI | Transmit diversity |
| | DCI format 1B | UE specific by C-RNTI | Closed-loop spatial multiplexing) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity |
| | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
| | DCI format 2B | UE specific by C-RNTI | Dual layer transmission, port 7 and 8 or single-antenna port, port 7 or 8 |

Table 2 shows supportable DCI formats according to each transmission mode in a condition set by C-RNTI in 3GPP TS 36.213. A terminal performs searching and decoding assuming that a DCI format exists in a control region interval according to a pre-configured transmission mode. For example, when the terminal is instructed with Transmission Mode 8, the terminal searches a common search space and a terminal-specific search space for DCI format 1A, and searches only a terminal-specific search space for DCI format 2B. A wireless communication system has been described above with reference to an LTE system, but an embodiment of the present disclosure is not applied only to the LTE system, but may also be applied to various wireless communication systems, such as NR and 5G systems. When an embodiment is applied to another wireless communication system, the value of k may be changed even in a system using a modulation method corresponding to FDD.

The wireless communication system based on CP-OFDM or SC-FDMA shown in FIG. 1 or 2 may be at least one of an LTE, LTE-A, and 5G system, but this is only an embodiment and the wireless communication system based on CP-OFDM or SC-FDMA is not limited to the above example.

Figure 3:
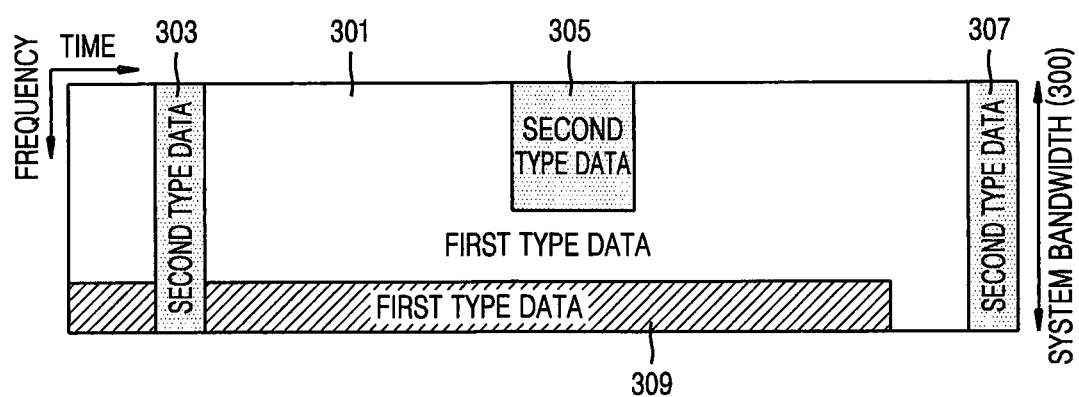
FIG. 3 is a diagram for describing a method of assigning first type data and second type data to a time-frequency resource region, according to an embodiment.

FIG. 3 is a diagram for describing a method of assigning first type data and second type data to a time-frequency resource region, according to an embodiment.

Referring to FIG. 3, first type data 301 and 309 and second type data 303, 305, and 307 may be assigned in an entire system frequency band 300, according to an embodiment. When the second type data 303, 305, and 307 are generated and required to be transmitted while the first type data 301 and 309 are assigned and transmitted in a specific frequency band, a portion where the first type data 301 and 309 are already assigned may be emptied or the second type data 303, 305, and 307 may be transmitted without transmitting the first type data 301 and 309.

Here, the first type data 301 and 309 may be data corresponding to a first type service. The first type service may include an eMBB service, and may include a service corresponding to a service that requires high speed data transmission or performs broadband transmission. Here, the first type data 301 and 309 may include eMBB data corresponding to the eMBB service. Also, the first type service may include an mMTC service, and may include a service that requires low speed or wide coverage, or low power consumption. Here, the first type data 301 and 309 may include mMTC data corresponding to the mMTC service.

The second type data 303, 305, and 307 may be data corresponding to a second type service. The second type service may include an URLLC service, and may include a service that requires low latency or high reliability transmission or another service that requires both low latency and high reliability. Here, the second type data 303, 305, and 307 may include URLLC data corresponding to the URLLC service.

Structures of physical layer channels used for each type to transmit the first type data 301 and 309 and the second type data 303, 305, and 307 may be different from each other. For example, at least one of lengths of transmission time interval (TTI), assignment units of a frequency source, structures of a control channel, and mapping methods of data may be different. In particular, the length of TTI used to transmit the URLLC data may be shorter than the length of TTI used to transmit the eMBB data or mMTC data. Also, a response of information related to the URLLC service may be transmitted faster compared to the eMBB service or the mMTC service, and accordingly, information may be transmitted or received with low delay.

According to the current embodiment, the eMBB data and the mMTC data are described as examples of the first type data 301 and 309, and the URLLC data is described as an example of the second type data 303, 305, and 307, but these are only examples and each type data is not limited thereto.

According to an embodiment, when the second type data 303, 305, and 307 correspond to a service that requires reducing latency among various types of services, the second type data 303, 305, and 307 may be transmitted after being assigned to a part of resources to which the first type data 301 and 309 are assigned. When the second type data 303, 305, and 307 are additionally assigned to the resources to which the first type data 301 and 309 are assigned, the first type data 301 and 309 may not be transmitted in redundant time-frequency resources, and accordingly, transmission performance of the first type data 301 and 309 may be reduced. In other words, transmission failure of the first type data 301 and 309 may occur due to the assignment of the second type data 303, 305, and 307.

Figure 4:
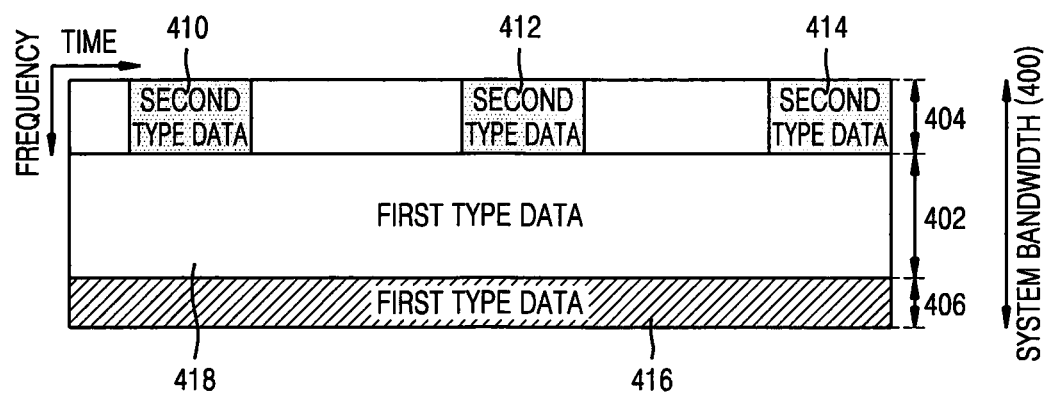
FIG. 4 is a diagram for describing a method of assigning first type data and second type data to a time-frequency resource region, according to another embodiment.

FIG. 4 is a diagram for describing a method of assigning first type data and second type data to a time-frequency resource region, according to another embodiment.

Referring to FIG. 4, service and data may be transmitted by using each of sub-bands 402, 404, and 406 obtained by dividing an entire system frequency band 400, according to an embodiment. Information related to sub-band configuration may be pre-determined. According to an embodiment, the information may be transmitted from a base station to a terminal via higher signaling. Also, information related to the sub-bands 402, 404, and 406 may be arbitrarily configured by the base station or a network node, and services may be provided to the terminal without having to transmit separate sub-band configuration information. In FIG. 4, the first sub-bands 402 and 406 may be used to transmit first type data 418 and 416, and the second sub-band 404 may be used to transmit second type data 410, 412, and 414.

Terms such as a physical channel and a signal in a general LTE or LTE-A system may be used to describe a method and apparatus proposed in the current embodiment. However, the content of the present disclosure may be applied to a wireless communication system other than the LTE and LTE-A system. For example, the content of the present disclosure may be applied to a 5G or NR system.

Hereinafter, in the present disclosure, transmitting and receiving operations of a terminal and base station for transmitting first type data and second type data are described, and a specific method for operating terminals scheduled for different types of services or data together in a same system is proposed. In the present disclosure, a first type terminal and a second type terminal respectively denote terminals that are scheduled for first type and second type services or data. According to an embodiment, the first type terminal and the second type terminal may be a same terminal or different terminals.

In embodiments hereinbelow, among signals transmitted from the base station to the terminal, a signal expecting a response from the terminal may be a first signal and a response signal of the terminal corresponding to the first signal may be a second signal. For example, an uplink scheduling grant signal and a downlink data signal may be the first signal. Also, an uplink data signal regarding uplink scheduling grant and hybrid automatic repeat request (HARQ) acknowledgement (ACK)/negative acknowledgement (NACK) regarding the downlink data signal may be the second signal. Also, in an embodiment, a service type of the first signal may be at least one of eMBB, URLLC, and mMTC, and the second signal may also correspond to at least one of the services.

The content of the present disclosure may be applied to FDD or TDD systems.

In the present disclosure, the higher signaling is a method of transmitting a signal from the base station to the terminal by using a downlink data channel of a physical layer or from the terminal to the base station by using an uplink data channel of the physical layer, and may also be referred to as radio resource control (RRC) signaling, packet data convergence protocol (PDCP) signaling, or MAC control element (CE).

In the present disclosure, the terminal may be a receiver and the base station may be a transmitter in a downlink channel, and the terminal may be a transmitter and the base station may be a receiver in an uplink channel. Also, a downlink control channel may be one or more of a cell common downlink control channel, a UE common downlink control channel, or a UE specific control channel, and downlink control information may correspond to one or more of cell common downlink control information, UE common downlink control information, or UE specific control information. Furthermore, the higher signaling may correspond to one or more of cell common higher signaling or UE specific higher signaling, and content related to a downlink control channel or downlink data channel may be applicable to an uplink control channel or uplink data channel.

Figure 5:
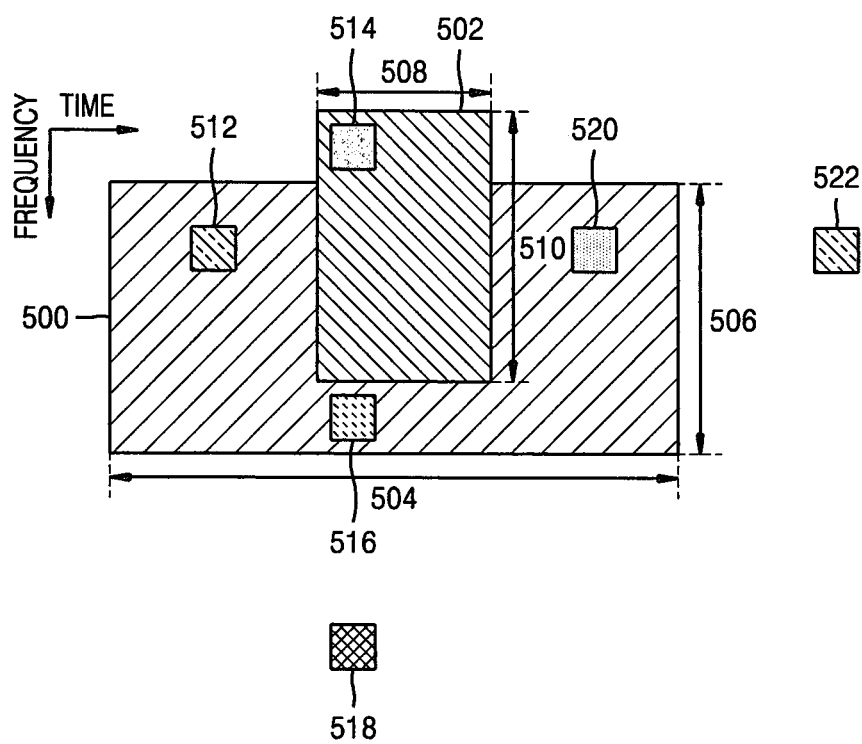
FIG. 5 is a diagram illustrating an instruction method using downlink control information when an interruption of data of a specific service occurs in a wireless communication system, according to an embodiment.

FIG. 5 is a diagram illustrating an instruction method using downlink control information when an interruption of data of a specific service occurs in a wireless communication system, according to an embodiment.

Referring to FIG. 5, a base station may transmit first type data 500 to a terminal for a first type service through a physical downlink data channel. A time interval 504 to which the first type data 500 is assigned is determined based on a unit in which the first type data 500 is transmitted. The unit may be a slot configured of 7 (or 14) OFDM symbols, may be configured of one or more OFDM symbols, or may be configured of one or more slots. The time interval 504 to which the first type data 500 is assigned may be continuously or discontinuously. Also, a frequency interval 506 to which the first type data 500 is assigned may be equal to or smaller than a maximum frequency band supportable by the terminal or a system maximum frequency band. The frequency interval 506 to which the first type data 500 is assigned may be assigned continuously or discontinuously.

According to an embodiment, a resource to which the first type data 500 is assigned may be used as a resource assigned for channel estimation. In this case, the first type data 500 may be a reference signal (RS) used for channel estimation, such as channel status information-reference signal (CSI-RS). Also, the first type data 500 may include an RS transmitted for downlink data and downlink channel estimation.

According to an embodiment, the base station may assign second type data 502 to all or some of time and frequency resources of time and frequency domains to which the pre-scheduled first type data 500 is assigned. The base station may assign the second type data 502 while avoiding the time and frequency domains to which the pre-scheduled first type data 500 is assigned. Also, the base station may assign the second type data 502 to all or some of time and frequency resources of time and frequency domains to which pre-scheduled two or more pieces of first type data 500 are assigned. Furthermore, the base station may assign the second type data 502 to time and frequency resources other than the time and frequency domains to which the pre-scheduled first type data 500 is assigned.

Such an operation is described as one of interruption, corruption indicator, puncturing, or preemption, and in the present disclosure, for convenience of description, the operation is described as interruption. However, the operation is not limited to the above terms and may be described by using various terms.

A time interval 508 to which the second type data 502 is assigned is determined based on a unit in which the second type data 502 is transmitted. The unit may be a slot configured of 7 (or 14) OFDM symbols, may be configured of one or more OFDM symbols, or may be configured of one or more slots. Here, subcarrier spacing used in the first type data 500 and subcarrier spacing used in the second type data 502 may be the same or different from each other. The time interval 508 to which the second type data 502 is assigned may be assigned continuously or discontinuously. A frequency interval 510 to which the second type data 502 is assigned may be equal to or smaller than a maximum frequency band supportable by the terminal or a system maximum frequency band. The frequency interval 510 to which the second type data 502 is assigned may be assigned continuously or discontinuously.

Referring to FIG. 5, an operation in which interruption occurs will be described. In terms of time, the time interval 508 assigned for the second type data 502 may overlap the entire or a part of the time interval 504 assigned for the first type data 500. Also, in terms of frequency, the frequency interval 510 assigned for the second type data 502 may overlap the entire or a part of the frequency interval 506 assigned for the first type data 500. As such, when intervals overlapping entirely or partially occur in both time and frequency intervals, it may be determined that the second type data 502 interrupt the entire or a part of the first type data 500.

When interruption occurs, the occurrence of interruption needs to be notified to the terminal supporting the first type service. When the terminal is unable to identify the occurrence of interruption, the terminal may receive the first type data 500 including a signal that is not its own data and attempt demodulation and/or decoding. In this case, demodulation and/or decoding is highly likely to fail due to the interruption. Also, when the first type data 500 is retransmitted and the terminal is unable to identify the occurrence of interruption, it is highly likely that the terminal may perform HARQ combining on the signal that is not its own data with the signal received before. In this case as well, the demodulation and decoding is highly likely to fail due to the interruption. Accordingly, in order to efficiently transmit the first type data 500, the interruption needs to be notified to the terminal supporting the first type service via a separate indicator. Such an indicator may be referred to as a second type data occurrence indicator, an interruption indicator, a correction indicator, a puncturing indicator, a preemption indicator, a terminal buffer management indicator, a terminal data management indicator, a terminal HARQ buffer combining indicator, or a terminal re-decoding indicator, and hereinafter, for convenience of description, the indicator may be described as an interruption indicator.

According to an embodiment, a condition for the terminal to perform downlink control information search including the interruption indicator in a valid transmission interval may include at least one of the following.

- When terminal failed downlink data demodulation and/or decoding
- When terminal received downlink data scheduling via downlink control information
- When terminal received measurement indication of downlink reference signal (for example, CSI-RS, phase tracking reference signal (PTRS), or the like) via downlink control information or when downlink reference signal measurement is configured by higher signaling
- When terminal is scheduled for physical downlink data channel resource region
- When terminal is assigned with physical downlink data channel resource region According to an embodiment, the terminal supporting the first type service may determine a frequency resource and/or a time resource where the second type data 502 is generated, based on the interruption indicator. In this case, the frequency and/or time resources indicated by the interruption indicator may accurately match or larger than the frequency and/or time resources to which the second type data 502 is assigned.

According to an embodiment, the interruption indicator may provide information about the frequency resource where the second type data 502 is generated by applying, as it is or after modification, a bitmap or LTE frequency resource assigning method of PRB or PRB group units. Also, the interruption indicator may provide information about the frequency resource where the second type data 502 is generated by using an offset based on a frequency band (or center frequency) through which a primary synchronization signal (PSS), a secondary synchronization signal (SSS), or a physical broadcast channel (PBCH) required for initial cell access is transmitted.

Also, the interruption indicator according to an embodiment may provide information about the time resource where the second type data 502 is generated via a value indicating a previous (or following) slot based on a time when the interruption indicator is transmitted. Furthermore, the time resource may be notified via a symbol range or symbol value within a slot pre-determined or indicated by another value.

Information included in the interruption indicator may include at least one of the following.

- Entire or part (configured of time or frequency) of physical downlink data channel resource region received by terminal
- Entire or part (configured of time or frequency) of physical downlink data channel resource region being received by terminal
- Entire or part (configured of time or frequency) of physical downlink data channel resource region to be received by terminal
- System frame number (SFN)
- SNF and number (or index) of symbols (or symbol groups)
- SFN, number (or index) of symbols (or symbol groups), and sub-frequency band (may be used mixed with sub-band)
- Value (or index) of previous (or following) valid transmission interval based on transmission interval through which interruption indicator is transmitted
- Value (or index), number (or index) of symbols (or symbol groups), and sub-frequency band of previous (or following) valid transmission interval based on transmission interval through which interruption indicator is transmitted Number (or index) of symbols (or symbol groups) of valid transmission interval Sub-frequency band of valid transmission interval Partial sub-band among carrier frequency band Sub-frequency band among frequency band supported by second type service Offset value based on center frequency through which synchronization signal (SS) is transmitted (for example, one or two offset values)

Offset value (one or two offset values) based on a particular frequency reference value Frequency resource information and/or time resource information included in the interruption indicator may be determined by one or a combination of two or more of the above examples, may be configured which type of information to use from the above examples via higher signaling, such as RRC or MAC CE, or may be configured which type of information to use from the above examples via L1 signaling (physical layer signaling).

Subcarrier spacing applied to the time resource and/or frequency resource indicated by the interruption indicator may be one specific value. Alternatively, the subcarrier spacing applied to the time and/or frequency resources indicated by the interruption indicator may be subcarrier spacing of the first type data 500 received or being received by the terminal. When the subcarrier spacing of the first type data 500 received or being received by the terminal and the subcarrier spacing applied to the resource indicated by the interruption indicator are different from each other, the terminal may apply frequency resource and/or time resource based on the subcarrier spacing applied to the resource indicated by the interruption indicator to the frequency resource and/or time resource based on the subcarrier spacing applied to the resource to which the first type data 500 is assigned to determine that the entire or a part of the resource region assigned to the first type data 500 is interrupted. For example, when the terminal that received data based on 15 kHz subcarrier spacing receives the interruption indicator indicating the resource based on 30 kHz subcarrier spacing, the terminal may interpret the resource indicated by the interruption indicator based on the 15 kHz subcarrier spacing.

When the subcarrier spacing applied to the second type data 502 and the subcarrier spacing applied to the first type data 500 are different from each other, the base station may configure a frequency unit and a time unit of the resource indicated by the interruption indicator based on the subcarrier spacing applied to the first type data 500 and provide the interruption indicator to the terminal supporting the first type service. Also, the base station may configure the frequency and time units of the resource indicated by the interruption indicator based on the subcarrier spacing applied to the second type data 502 and provide the frequency and time units to the terminal supporting the first type service. Here, the terminal supporting the first type service may recognize and suitably interpret that the subcarrier spacing applied to the resource indicated by the interruption indicator and the subcarrier spacing applied to the first type data 500 received or being received by the terminal are different from each other.

The subcarrier spacing applied to the frequency unit and the time unit of the resource indicated by the interruption indicator may be used by being defined as one of a specific subcarrier spacing, the subcarrier spacing applied to the first type data 500, or the subcarrier spacing applied to the second type data 502, may be configured via higher signaling such as RRC or MAC CE, or may be configured via L1 signaling.

According to an embodiment, a method of configuring the interruption indicator may include at least one of the following. Whether to use the interruption indicator, a purpose of the interruption indicator, information included in the interruption indicator, or a physical control channel through which the interruption indicator is transmitted may be configured according to a following method.

Common or UE specific higher signaling

Common or UE specific L1 signaling

Implicit indication associated with frequency band

Implicit indication associated with subcarrier spacing

Combination of above methods

According to an embodiment, when the interruption indicator is configured, the terminal may search a physical downlink control channel for downlink control information including the interruption indicator. The interruption indicator may be included in the downlink control information or may be configured in a form of a specific preamble sequence. When the interruption indicator is included in the downlink control information, the downlink control information may be at least one of cell common downlink control information, UE common downlink control information and/or UE specific downlink control information. The cell common downlink control information may be transmitted through a physical cell common downlink control channel, the UE common downlink control information may be transmitted through a physical UE common downlink control channel, and the UE specific downlink control information may be transmitted through a physical UE specific downlink control channel.

Also, the interruption indicator may be transmitted from a downlink control channel similar to PCFICH or PHICH of general LTE. The downlink control information through which the interruption indicator is transmitted may be transmitted through a pre-configured physical downlink control channel via higher signaling. When the interruption indicator is present in a sequence form, the terminal may determine generation of interruption based on whether a specific preamble sequence is detected. Also, sequence information configured as the interruption indicator may include frequency and time information.

According to an embodiment, when the terminal receives downlink control information scrambled with a specific terminal identifier (RNTI) related to the interruption indicator through the (UE common or UE specific) downlink control channel, the terminal may determine that the downlink control information includes interruption indicator information. The downlink control information may include only the interruption indicator information or may include the interruption indicator information and another type of information (for example, a slot format indicator), and this may be configured via UE specific or UE common higher signaling.

CRC combined with control information including the interruption indicator information may be scrambled with a specific RNTI for the interruption indicator information. To receive the interruption indicator information, the terminal may search for the downlink control information combined with the CRC scrambled with the RNTI through the UE specific or UE common control channel. The downlink control information including the interruption indicator information may have a payload size equal to or different from downlink control information including another information. When the payload sizes of the downlink control information including the interruption indicator information and the downlink control information including the other information are different from each other, the terminal may assume and search for downlink control information having different payload sizes. When the payload sizes of the downlink control information including the interruption indicator information and the downlink control information including the other information are the same, the downlink control information including the interruption indicator information and the downlink control information including the other information may be distinguished by using the RNTI scrambled to the CRC combined with the downlink control information.

Also, it is possible to notify whether information included in downlink control information is the interruption indicator information or the other information by using some bits of fields configuring the downlink control information. Such a method is a distinguishing method using some fields (configured of one or at least two bits) among the fields configuring the downlink control information instead of using RNTI.

According to an embodiment, the terminal may determine, through the interruption indicator information, that transmission of actually assigned data is not performed in some resources among time or frequency resource region assigned in a downlink (or uplink) data channel scheduled by the base station. The terminal may not store data in a buffer or discard data stored in the buffer, wherein the data is transmitted to a partial data resource region where the transmission of the actually assigned data is not occurred, by using the interruption indicator information. Also, the terminal may reflect such an operation to perform HARQ ACK/NACK reporting or perform HARQ combining (during retransmission). The downlink control information including the interruption indicator may be configured via higher signaling such as RRC, for each terminal. In other words, the terminal determines whether to search for the downlink control information including the interruption indicator information according to RRC configuration. In particular, the terminal determines whether to search for the downlink control information combined with the CRC scrambled with the specific RNTI including the interruption indicator information, via RRC configuration. Alternatively, the terminal determines whether to search for the downlink control information assuming that a particular downlink control information format (for example, a downlink control information size or a resource region to which the downlink control information is mapped) including the interruption indicator information, via RRC configuration, is present.

The terminal according to an embodiment may perform or not perform a search for the downlink control information including the interruption indicator information via (group common or UE specific) higher signaling or (group common or UE specific) L1 signaling. Also, the terminal may perform or not perform the search for the downlink control information including the interruption indicator according to a frequency band. Also, the terminal may perform or not perform the search for the downlink control information including the interruption indicator according to a specific time (for example, a particular slot number, an uplink dedicated slot, or an uplink center slot). The terminal may perform or not perform the search for the downlink control information including the interruption indicator according to a service type (for example, whether first, second, or third type service is supported).

FIG. 5 shows a location of a resource where the interruption indicator is providable. Referring to FIG. 5, according to an embodiment, 6 types of providable interruption indicators 512, 514, 516, 518, 520, and 522 are shown. The base station may provide interruption information to the terminal using the first type service by using one or at least two of the 6 types of interruption indicators 512, 514, 516, 518, 520, and 522. The following describes features of the 6 types of interruption indicators 512, 514, 516, 518, 520, and 522.

1. The interruption indicator 512 may be included in the downlink control information and transmitted to the terminal for the first type service, before actual interruption occurs. The physical downlink control channel through which the downlink control information is transmitted may be configured in advance via higher signaling. In this case, the interruption indicator 512 may include information on specific time interval (or including a frequency interval) after a time when the corresponding interruption indicator is transmitted. Such an interruption indicator 512 may be applied identically as an indicator that indicates a reserved resource for a future service.

2. The interruption indicator 514 may be included in the downlink control information and transmitted to the terminal for the first type service while the actual interruption occurs. The physical downlink control channel through which the downlink control information is transmitted may be configured in advance via higher signaling. In this case, the interruption indicator 514 is included in the resource region to which the second type data 502 is assigned, and the second type data 502 may be assigned while avoiding the resource region to which the downlink control information including the interruption indicator is assigned. Also, the interruption indicator 514 may include information on a specific time interval (or including a frequency interval) including a time when the corresponding indicator is transmitted, or such time interval information may be omitted.

3. The interruption indicator 516 may be included in the downlink control information and transmitted to the terminal for the first type service while the actual interruption occurs. The physical downlink control channel through which the downlink control information is transmitted may be configured in advance via higher signaling. In this case, the interruption indicator 516 is included in the resource region to which the first type data 500 is assigned, and the first type data 500 may be assigned while avoiding the resource region to which the downlink control information including the interruption indicator is assigned. Also, the interruption indicator 516 may include information on a specific time interval (or including a frequency interval) including a time when the corresponding interruption indicator is transmitted, or such time interval information may be omitted.

4. The interruption indicator 518 may be included in the downlink control information and transmitted to the terminal for the first type service while the actual interruption occurs. The physical downlink control channel through which the downlink control information is transmitted may be configured in advance via higher signaling. In this case, the interruption indicator 518 is included in a resource region other than that to which the first type data 500 is assigned. Also, the interruption indicator 518 may include information on a specific time interval (or including a frequency interval) including a time when the corresponding interruption indicator is transmitted, or such time interval information may be omitted.

5. The interruption indicator 520 may be included in the downlink control information and transmitted to the terminal for the first type service, after actual interruption occurs. The physical downlink control channel through which the downlink control information is transmitted may be configured in advance via higher signaling. In this case, the interruption indicator 520 may be included in the time interval 504 to which the first type data 500 is transmitted. Also, the interruption indicator 520 may include information on a specific time interval (or including a frequency interval) before a time when the corresponding interruption indicator is transmitted.

6. The interruption indicator 522 may be included in the downlink control information and transmitted to the terminal for the first type service, after actual interruption occurs. The physical downlink control channel through which the downlink control information is transmitted may be configured in advance via higher signaling. In this case, the interruption indicator 522 is not included in the time interval 504 to which the first type data 500 is transmitted. Also, the interruption indicator 522 may include information on a specific time interval (or including a frequency interval) before a time when the corresponding indicator is transmitted.

The base station may transmit, to the terminal, the downlink control information including one or at least two of the 6 types of interruption indicators 512, 514, 516, 518, 520, and 522 through the physical downlink control channel, and the terminal supporting the first type service may search for the at least one of the 6 types of interruption indicators 512, 514, 516, 518, 520, and 522.

Operations of the terminal may be described as follows. According to an embodiment, the terminal may search the physical downlink control channel through which the downlink control information including the interruption indicator indicating interruption of a corresponding first type data reception (frequency or time) interval is transmitted, while receiving the first type data 500, after reception is completed, or before reception starts.

Also, the terminal may not search the physical downlink control channel through which the downlink control information including the interruption indicator indicating the interruption of the corresponding first type data reception (frequency or time) interval is transmitted, while receiving the first type data 500 or before the reception starts.

Also, the terminal may not search the physical downlink control channel through which the downlink control information including the interruption indicator indicating the interruption of the corresponding first type data reception (frequency or time) interval is transmitted, when the first type data 500 is not scheduled.

Also, the terminal may search the physical downlink control channel through which the downlink control information including the interruption indicator indicating the interruption of the corresponding first type data reception (frequency or time) interval is transmitted, after demodulation and/or decoding of the first type data 500 fails.

Also, the terminal may search the physical downlink control channel through which the downlink control information including the interruption indicator notifying interruption of a downlink scheduled downlink data resource (or channel estimation resource) region is transmitted. Here, the downlink data resource or channel estimation resource may be the first type data 500.

Also, the terminal may not search the physical downlink control channel through which the downlink control information including the interruption indicator notifying interruption of a downlink data resource (or channel estimation resource) region that is not downlink scheduled is transmitted. Here, the downlink data resource or channel estimation resource may be the first type data 500.

Also, the terminal may search a valid physical downlink control channel through which the downlink control information including the interruption indicator notifying interruption of a downlink scheduled valid downlink data resource (or channel estimation resource) region is transmitted. Here, the downlink data resource or channel estimation resource may be the first type data 500.

Also, the terminal may not search the valid physical downlink control channel through which the downlink control information including the interruption indicator notifying interruption of a valid downlink data resource (or channel estimation resource) region that is not downlink scheduled is transmitted. Here, the downlink data resource or channel estimation resource may be the first type data 500.

According to an embodiment, an example of a method by which the terminal does not search for the downlink control information may include at least one of followings.

Terminal does not perform blind decoding on control information format including downlink control information.

Terminal does not perform blind decoding by using specific RNTI scrambled with downlink control information.

Terminal does not perform control information search on physical downlink control channel resource region configured to transmit downlink control information.

According to an embodiment, when the interruption indicator included in the downlink control information is received through the valid downlink control channel, the terminal may determine that the frequency or time resource in the specific slot indicated through the interruption indicator is interrupted. At this time, the terminal may discard, from a terminal buffer, all of code blocks at least partially overlapping the frequency or time resource in the specific slot indicated by the interruption indicator or at least partially overlapping data before decoding. For example, the terminal may not store, in the buffer, the block codes at least partially overlapping the frequency or time resource in the specific slot indicated by the interruption indicator or the at least partially overlapping data before decoding.

Also, the terminal may not perform HARQ combining on the code blocks at least partially overlapping the frequency or time resource in the specific slot indicated by the interruption indicator among the physical downlink data channel resource region, with code blocks retransmitted afterward.

Also, the terminal may discard, from the terminal buffer, a code block of which demodulation and/or decoding failed from among the code blocks at least partially overlapping the frequency or time resource in the specific slot indicated by the interruption indicator among the physical downlink data channel resource region. For example, the terminal may not store, in the buffer, the code block of which the demodulation and/or decoding failed from among the code blocks at least partially overlapping the frequency or time resource in the specific slot indicated by the interruption indicator.

Also, the terminal may not perform HARQ combining on the code block of which the demodulation and/or decoding failed among the code blocks at least partially overlapping the frequency or time resource in the specific slot indicated by the interruption indicator among the physical downlink data channel resource region, with the code blocks retransmitted afterward.

Also, the terminal may not use a pre-configured physical downlink data channel resource region corresponding to the time and/or frequency resource region indicated by the interruption indicator, for demodulation and/or decoding (or HARQ combining).

Also, the terminal may discard a downlink reference signal measurement value corresponding to the time and/or frequency resource region indicated by the interruption indicator or may not perform measurement on a downlink reference signal. Furthermore, the terminal may not report the downlink reference signal measurement value to the base station.

According to an embodiment, the base station may notify the terminal of interruption information of a following transmission interval or a previous transmission interval based on a transmission interval (for example, a slot) in which the interruption indicator is transmitted, through transmission interval indicator information included in the interruption indicator. For example, when 3 bits are used as a transmission interval indicator included in the interruption indicator, total 8 pieces of information may be used to notify which transmission interval is indicated by the interruption indicator based on a transmission interval in which a current interruption indicator is transmitted. In particular, when the interruption indicator indicates the interruption information of the previous transmission interval, 000 may be used to indicate a current transmission interval, 001 may be used to indicate an immediately previous transmission interval, and 010 may be used to indicate a second immediately previous transmission interval. However, this is only an example and thus is not limited thereto. Information about the transmission interval may be provided by adding 1 bit to the interruption indicator or by configuring 1 bit among existing bits to denote the previous transmission interval when the 1 bit is 0 and to denote the following transmission interval when the 1 bit is 1. Alternatively, the bit may be configured vice versa.

According to an embodiment, the specific transmission interval indicated by the higher signaling, by the L1 signaling, or implicitly by the interruption indicator may be pre-configured. In particular, a range of the transmission interval indicatable by the interruption indicator may be restricted according to a transmission period of the downlink control channel through which the downlink control information including the interruption indicator is transmitted. For example, when the transmission period is every transmission interval, the transmission interval indicated by the interruption indicator may be the immediately previous transmission interval of the transmission interval in which the interruption indicator is transmitted. Alternatively, when the transmission period of the indicator is 2 transmission intervals, the transmission interval indicated by the interruption indicator information may be the immediately previous transmission interval and the second immediately previous transmission interval of the transmission interval in which the interruption indicator information is transmitted.

When the specific transmission interval is indicated based on the transmission interval (for example, the slot) in which the interruption indicator is transmitted or the specific transmission interval is indicated via higher signaling, L1 signaling, or implicitly, the interruption indicator may additionally include information indicating the frequency or time resource present in the corresponding transmission interval. The time resource (for example, the value or number of OFDM symbols) present in the transmission interval for indication of the time resource may be indicated by using a bitmap method or a specific rule. Also, the frequency resource present in the transmission interval for indication of the frequency resource may be specified on the basis of offset value(s), based on a PRB index or center frequency (a center or boundary value of a frequency band in which PSS, SSS, PBCH used for initial access is transmitted).

According to an embodiment, the base station may transmit, to the terminal, the interruption indicator by including the information indicating only the specific transmission interval (for example, the slot). When the physical downlink data channel resource corresponding to the indicated specific transmission interval is assigned by the base station, the terminal may discard the code blocks of which demodulation and/or decoding failed from the buffer or discard all data channel resources from the buffer. For example, when the physical downlink data channel resource corresponding to the indicated specific transmission interval is assigned by the base station, the terminal may not store the code blocks of which demodulation and/or decoding failed in the buffer or not store the all data channel resources in the buffer.

According to an embodiment, when the downlink data channel resource region including the downlink data information scheduled via the UE common, UE group common, or UE specific control information and the UE common, UE group common, or UE specific downlink control region including the interruption indicator information overlap each other, it may be possible to search or not search for the downlink control region including the interruption indicator information. For example, when the downlink data information currently being received adaptively supports demodulation and/or decoding according to the interruption indicator information, the terminal may search for the downlink control region including the interruption indicator information. Also, because adaptive demodulation and/or decoding is not possible through the interruption indicator information when the terminal is receiving the downlink data, the terminal may not search for the downlink control region including the interruption indicator information while receiving the downlink data.

According to an embodiment, an interruptible resource region indicated by the interruption indicator included in the downlink control information may be pre-configured with respect to the frequency or time interval via UE specific or UE common higher signaling. Also, the interruptible resource region indicated by the interruption indicator included in the downlink control information may allow each terminal to interpret a pre-assigned frequency band interval (BWP) implicitly as an interruptible frequency resource region. Each terminal may interpret the interruptible resource region indicated by the interruption indicator included in the downlink control information implicitly as an interruptible time resource region by using a time interval in which the pre-configured downlink control information including the interruption indicator is transmittable or a ratio thereof. Also, the specific frequency unit or specific time unit may be configured simultaneously or separately via the UE specific or UE common higher signaling, with respect to each frequency interval or time interval configured via higher signaling.

According to an embodiment, information configuration of the interruption indicator may vary according to the interruptible resource region configured implicitly or explicitly. Also, the interruption indicator information may indicate one or at least two values with respect to (time, frequency, or combination thereof) candidate resource regions configured based on the interruptible resource region configured implicitly or explicitly. For example, about n interruptible candidate resource regions may be pre-configured, and information indicating generation of actual interruption in one or at least two candidate regions among the n candidate regions may be transmitted by the interruption indicator. Each candidate region may be configured with a resource configured using time, frequency, or combination thereof. When only the time information is included in the candidate region, the frequency information may correspond to all interruptible frequency resource regions pre-configured implicitly or explicitly, or an interrupted time-frequency resource region may be determined via a combination with a candidate region having different frequency information. When only the frequency information is included in the candidate region, the time information may correspond to all interruptible time resource regions pre-configured implicitly or explicitly, or an interrupted time-frequency resource region may be determined via a combination with a candidate region having different time information.

According to an embodiment, the interruptible resource region indicated by the interruption indicator included in the downlink control information may be pre-configured with respect to the frequency or time interval via the UE specific or UE common higher signaling. The terminal may determine whether to search for the downlink control information including the interruption indicator information by comparing the configured interruptible resource region and the frequency band interval (BWP) currently configured. For example, when the configured frequency band interval at least partially overlaps the interruptible resource region (in particular, the frequency band) indicated by the interruption indicator, the terminal may determine to search for the downlink control information including the interruption indicator information. Also, when the configured frequency band interval does not overlap the interruptible resource region (in particular, the frequency band) indicated by the interruption indicator, the terminal may determine not to search for the downlink control information including the interruption indicator information.

When a field selecting indication of HARQ combining with respect to a specific code block is present while downlink data physical channel resource region scheduling indicating retransmission via a UE specific downlink control channel is performed, the terminal may determine interruption based on the indication of HARQ combining together with the interruption indicator including the downlink control information received through the UE common or common downlink control channel. For example, when the HARQ combining indicator indicates not to perform HARQ combining with respect to one or at least two code blocks, the terminal may determine that at least a part of the downlink physical data channel resource region to which the corresponding code block is mapped is interrupted in previous transmission. Also, the terminal may accurately determine which downlink physical data channel resource region is interrupted based on information of the frequency resource or time resource included in the interruption indicator received via the UE common control channel. For example, the terminal may additionally determine generation of interruption with respect to an intersection (or union) of interruptible regions received via each control information, and perform demodulation and/or decoding after performing HARQ combining on remaining regions excluding the interrupted regions.

Figure 6:
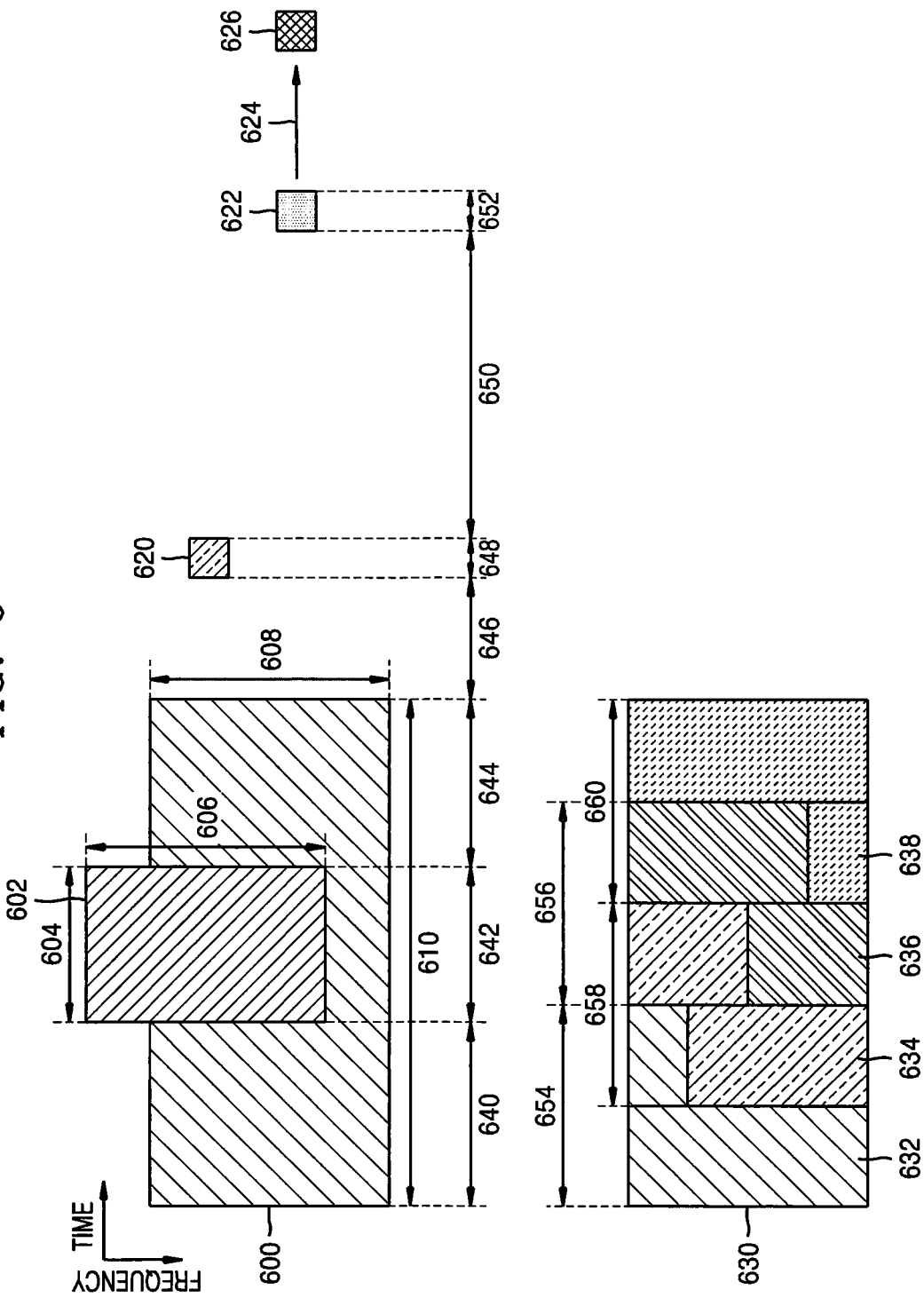
FIG. 6 is a diagram showing a hybrid automatic repeat request (HARQ) acknowledgement (ACK)/negative acknowledgement (NACK) transmission method according to an embodiment.

FIG. 6 is a diagram showing a HARQ ACK/NACK transmission method according to an embodiment.

Referring to FIG. 6, while a physical data resource region 600 for transmitting first type data to a terminal is assigned, a base station may schedule or assign a physical data resource region 602 for transmitting second type data to the same or another terminal, to the entire or a part of a data resource region pre-scheduled or assigned for the transmission of the first type data. The terminal that receives the first type data requires interruption information to determine generation of second type data service. Accordingly, an interruption indicator may be transmitted to the terminal via a physical resource region 620 used as a UE common, UE group common, or UE specific control channel. Also, the terminal may be implicitly or explicitly assigned with a physical channel resource region 622 that additionally reports a HARQ ACK result regarding the first type data, when scheduled for the first type data by the base station.

According to an embodiment, the terminal may be assigned with all of a downlink physical data resource region and an uplink physical control resource region for HARQ ACK/NACK reports regarding the corresponding data, via the UE group, UE group common, or UE specific control channel. Also, upon being assigned with the downlink physical data resource region via the UE group, UE group common, or UE specific control channel, the terminal may be implicitly assigned with the uplink physical control resource region for the HARQ ACK/NACK reports regarding the corresponding data. Also, the terminal may be assigned with all of a downlink reference signal measurement resource region for channel estimation and an uplink physical control resource region for HARQ ACK/NACK reports regarding the corresponding data, via the UE group, UE group common, or UE specific control channel. In addition, upon being assigned with the downlink reference signal measurement resource region for channel estimation via the UE group, UE group common, or UE specific control channel, the terminal may be implicitly assigned with a uplink physical control resource region for a channel estimation result report.

Referring to FIG. 6, a time interval 610 and a frequency interval 608 of the physical data resource region 600 to which the first type data (or a reference signal for channel estimation) is assigned, and a time interval 604 and a frequency interval 606 of the physical data resource region 602 to which the second type data is assigned are illustrated. Also, a time interval 648 in which UE specific, UE group, or UE common control information 620 including the interruption indicator, and a time interval 652 of the physical channel resource region 622 for an uplink control channel for the first type data or a downlink channel estimation result report are illustrated. In addition, time differences between downlink channel estimation physical resource regions, downlink physical data resource regions, or uplink physical control resource regions are illustrated as time intervals 640, 642, 644, 646, and 650.

Downlink data generally includes one or at least two code blocks, and each of the code blocks are transmitted by being mapped to a physical resource region for an actual data channel. In FIG. 6, a mapping relationship between a physical resource region 630 to which downlink data including a code block concept is assigned and four code blocks 632, 634, 636, and 638 included in the physical resource region is illustrated. Also, time intervals 654, 658, 656, and 660 occupied by code blocks are illustrated.

In FIG. 6, a time unit may be one symbol or a slot including 7 or 14 symbols based on a specific sub-frequency interval. Also, mapping of a physical resource region to which data or control information is assigned may also be sufficiently applied to another time interval or frequency interval. In addition, the terminal may sequentially perform downlink physical channel reception (or downlink reference signal channel estimation), interruption indication search, and uplink control channel transmission, via a time interval of each physical resource or a time interval between physical resources.

Referring to FIG. 6, according to an embodiment, a time difference between the physical channel resource region to which downlink data (or downlink reference signal) is assigned and the downlink physical control resource region including the interruption indicator may be indicated by one or a combination of at least two of the time intervals 640, 642, 644, 646, and 648. Also, a time difference between the physical channel resource region to which downlink data or downlink reference signal is assigned and the uplink physical control channel resource region for HARQ ACK feedback report or channel estimation result report may be indicated by one or a combination of at least two of the time intervals 640, 642, 644, 646, 648, 650, and 652.

According to an embodiment, a time difference between the code block configuring the physical channel resource region to which downlink data or downlink reference signal is assigned and the downlink physical control resource region including the interruption indicator information may be indicated by one or a combination of at least two of the time intervals 640, 642, 644, 646, 648, 654, 656, 658, and 660. Also, a time difference between the code block configuring the physical channel resource region to which downlink data or downlink reference signal is assigned and the uplink physical control channel resource region for HARQ ACK feedback report or channel estimation result report may be indicated by one or a combination of at least two of the time intervals 640, 642, 644, 646, 648, 650, 652, 654, 656, 658, and 660.

According to an embodiment, a time difference between the downlink physical control resource region including the interruption indicator and the uplink physical control channel resource region for HARQ ACK feedback report or channel estimation result report may be indicated by one or a combination of at least two of the time intervals 648, 650, and 652.

A time interval shown in FIG. 6 may be indicated by a specific value. In particular, the specific value may be indicated by a difference between a time when a symbol or slot configuring each resource region starts to be received or transmitted and/or times when the reception or transmission is ended. Such a specific value may have a positive or negative value or may not exist based on a reference time. When the specific value has a negative value, an order of resource regions assigned for specific physical control or data channels are changed.

The resource regions assigned for physical control and data channel shown in FIG. 6 may have frequency bands that are the same, different from each other, or partially same. Also, a relationship between resources for physical channels considering a specific time value (for example, a symbol start value, a symbol middle value, or a symbol end value) of a resource region for downlink physical control channel or downlink data physical channel aside from the time intervals shown in FIG. 6 may also be indicated as a time interval.

The time interval described in an embodiment may be described in a term such as a time difference between resources for different physical channels.

Referring to FIG. 6, when a specific condition is satisfied, the physical channel resource region 622 for uplink control channel for the first type data or downlink channel estimation result report may be changed to a physical channel resource region 626 pre-configured or newly configured between the base station and the terminal, instead of the pre-configured physical channel resource region 622. Whether the specific condition is satisfied may be determined by comparing, with a specific threshold value, a time length including one or a combination of at least two of a first type data reception time, an interruption indicator reception time, or pre-uplink physical control resource region times. Also, whether the specific condition is satisfied may be determined by comparing, with a certain threshold value, a size (or a ratio or degree) of a resource region in which each of code blocks configuring a transport block for the first type data is interrupted by the second type data. The terminal may determine whether to use the existing physical channel resource region 622 for the uplink control channel or the newly configured physical channel resource region 626 based on whether the specific condition is satisfied.

Figure 7:
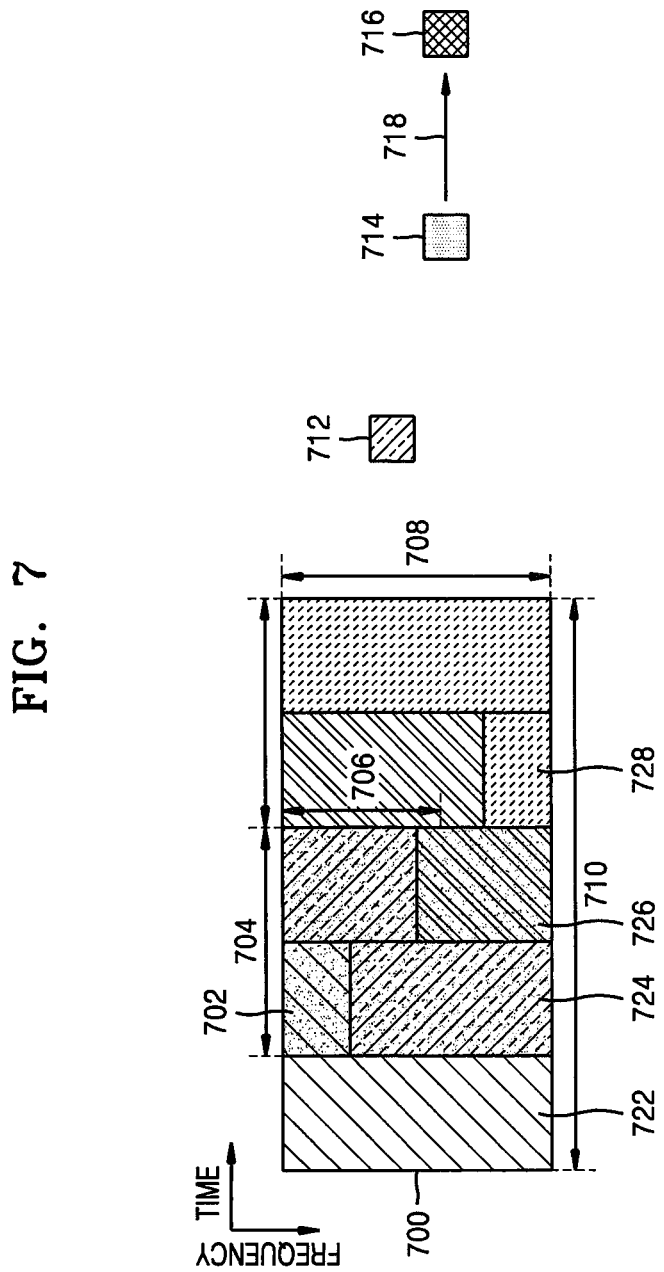
FIG. 7 is a diagram showing a relationship between an interruption region of data and a code block, according to an embodiment.

FIG. 7 is a diagram showing a relationship between an interruption region of data and a code block, according to an embodiment.

Referring to FIG. 7, it is possible for second type data to interrupt (702) the entire or a part of a resource region 700 assigned for first type data, while the resource region 700 for a downlink physical data channel assigned for the first type data is already scheduled. Here, the first type data is not transmitted to a terminal in a time 704-frequency 706 region interrupted as the entire or a part of code blocks configuring the first type data is interrupted by the second type data. When n code blocks configure one piece of first type data (or a transport block), it is possible that a resource region for a physical data channel to which a specific code block is assigned may be entirely interrupted or partially interrupted. For example, in a code block 722 and a code block 726 of FIG. 7, a partial resource region is interrupted by the second type data among downlink physical data channel resource region to which each code block is assigned. Also, in a code block 724, an entire resource is interrupted by the second type data among downlink physical data channel resource region to which the corresponding code block is assigned. It is possible that a resource region for a physical data channel to which a specific code block is assigned may not be entirely interrupted. For example, in a code block 728 of FIG. 7, an entire resource is not interrupted by the second type data among a downlink physical data channel resource region to which the corresponding code block is assigned.

When a partial resource region among the physical data channel resource region to which the specific code block is assigned is not interrupted by the second data, it is possible for the terminal to perform re-decoding on uninterrupted remaining resource regions. Also, it is possible for the terminal to discard the interrupted resource region and perform HARQ combining on the remaining resource regions with a code block retransmitted later In other words, the terminal may perform HARQ combining in code block units.

According to an embodiment, when the terminal performs re-decoding for a HARQ ACK/NACK report, the HARQ ACK/NACK report through a pre-configured uplink physical control channel resource may be difficult due to additional time taken by the re-decoding. In this case, the terminal may change (718) the resource region for the HARQ ACK/NACK report to a newly configured uplink physical control channel resource region 716 instead of an existing resource region 714 for an uplink control channel. The newly configured uplink physical control channel resource region 716 may be configured according to a pre-configured rule between the terminal and a base station (for example, after a specific time from a time when an interruption indicator is transmitted) or may be explicitly indicated via the interruption indicator or additional L1 signaling. When an additional time required for re-decoding of partially interrupted code blocks is within a pre-configured HARQ ACK/NACK report time, the HARQ ACK/NACK report may be performed by using the existing resource region 714 for the uplink control channel by performing the re-decoding on the corresponding code blocks.

According to an embodiment, when an entire resource region among the physical data channel resource region to which the specific code block is assigned is interrupted by the second data, it is less likely that demodulation and/or decoding of the data will succeed even when the terminal performs re-decoding, and thus the terminal may not store the received data in a terminal buffer. In this case, because the additional time required for re-decoding is not required, the terminal may perform HARQ ACK/NACK report via the pre-configured uplink physical control channel resource 714 by reflecting corresponding information.

FIG. 7 may be applied to channel estimation such as CSI-RS, in addition to the above embodiment. When a part of a physical channel resource region configured for downlink channel estimation is interrupted, the interrupted resource region is not used for channel estimation, and thus the terminal may report to the base station by performing channel estimation only on remaining region excluding the interrupted resource region. Also, when the interrupted region is equal to or greater than the partial region among the physical channel resource region assigned for channel estimation, the terminal may reduce power consumption by not performing the channel estimation or not reporting the result even when the channel estimation is already performed before receiving the interruption indicator.

Figure 8:
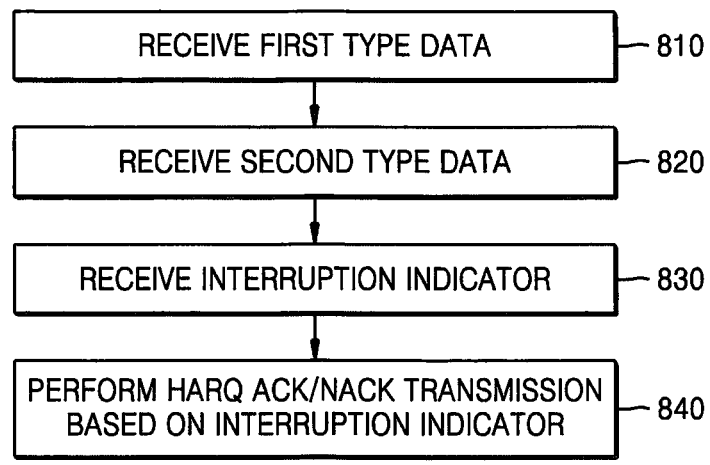
FIG. 8 is a flowchart of a method of transmitting and receiving control information of a terminal, according to an embodiment.

FIG. 8 is a flowchart of a method of transmitting and receiving control information of a terminal, according to an embodiment.

Referring to FIG. 8, the terminal receives first type data, in operation 810. In particular, the terminal may be scheduled for a downlink physical data channel resource region for the first type data via a downlink physical control channel, and receive the first type data in the scheduled resource region.

In operation 820, the terminal receives second type data. According to an embodiment, the second type data may be assigned to at least a part of the resource region to which the first type data is assigned. The terminal may receive the second type data by using at least a partial resource of the resource region to which the first type data is assigned. This is called interruption in the present disclosure.

When the terminal scheduled for the second type data is the same terminal as the terminal receiving the first type data, the terminal may determine that a resource region scheduled for the second type data interrupted at least a part of the resource region for the first type data scheduled before the second type data. However, when the terminal scheduled for the second type data and the terminal receiving the first type data are different terminals, the terminal scheduled for the second type data is unable to determine that the resource region scheduled for the second type data interrupted at least a part of the resource region for the first type data scheduled before the second type data, unless downlink control information including a separate interruption indicator is received, despite the second type data being received. In other words, because the terminal receives the second type data by using the resource region to which the first type data is assigned, the terminal is unable to verify that the second type data is received without separate interruption information. In other words, the terminal is unable to verify occurrence of interruption unless the separate interruption information is received.

As a result, generation of the second type data is unable to be verified when the terminal scheduled for the second type data and the terminal receiving the first type data are different from each other and at the same time, the terminal receiving the first type data does not receive the downlink control information including the separate interruption information. In this case, the terminal may verify the generation of the second type data.

In operation 830, the terminal receives an interruption indicator. When the terminal scheduled for the second type data and the terminal receiving the first type data are different from each other, the terminal attempts to search for and receive separate downlink control information including the interruption indicator to verify the generation of the second type data. When searching for the interruption indicator succeeds, the terminal may verify the occurrence of interruption in the downlink data physical channel resource region for the pre-scheduled first type data.

In the present disclosure, for convenience of description, operations 810 to 830 are described to be performed sequentially, but this is only an example and operations 810 to 830 may be performed simultaneously or sequentially. In addition, when operations 810 to 830 are performed sequentially, an order thereof is not restricted. For example, operations 810 to 830 may be performed simultaneously, or operations 810 and 820 may be performed simultaneously and operation 830 may be performed therebefore or thereafter.

Lastly, in operation 840, the terminal performs an HARQ ACK/NACK transmission based on the received interruption indicator. According to an embodiment, the terminal may perform the HARQ ACK/NACK transmission according to whether a certain condition is satisfied based on the interruption indicator. In particular, when the certain condition is satisfied, the terminal may change a resource region for HARQ ACK/NACK report to a newly configured uplink physical control channel resource region instead of an existing resource region for an uplink control channel. For example, when a pre-scheduled first type data reception result report time is short, it may be difficult to re-demodulate and/or re-decode certain code block(s) considering the interruption indicator. Thus, the terminal may change the resource region for HARQ ACK/NACK to the new uplink physical control channel resource region.

The certain condition may include a ratio of occurrence of interruption in an individual code block when interruption occurs in downlink data physical channel resources to which individual code blocks configuring a transport block for transmitting the first type data are assigned. For example, when at least a certain threshold number of regions are interrupted among resource regions assigned to transmit a certain code block, it is less likely that re-demodulation and/or re-decoding of the code block may succeed, and thus re-demodulation and/or re-decoding may not be performed.

Also, the certain condition may include differences of two or more combinations of following times.

1. Time when first type data is received (for time when individual code blocks are received)
2. Time when second type data is interrupted
3. Time when downlink control information including interruption indicator is received
4. First type data reception result report (or HARQ ACK/NACK result report)

As described above, the terminal may perform the HARQ ACK/NACK transmission according to whether the certain condition is satisfied based on the interruption indicator, when performing the HARQ ACK/NACK transmission. In particular, the terminal may perform a following operation.

According to an embodiment, the terminal may determine whether to perform re-demodulation and/or re-decoding on the individual code blocks based on the interruption indicator. In this case, whether to perform re-demodulation and/or re-decoding on the interrupted individual code blocks may be a criterion for performing the HARQ ACK/NACK transmission of the terminal. For example, when the terminal determines not to perform re-demodulation and/or re-decoding on the individual code blocks based on the interruption indicator, the terminal may perform a pre-configured HARQ ACK/NACK transmission without changing the HARQ ACK/NACK transmission.

Also, the terminal may determine whether to use a pre-scheduled resource or a resource changed implicitly or explicitly, to perform the HARQ ACK/NACK transmission. For example, when the terminal determines to perform re-demodulation and/or re-decoding on the interrupted code block, the uplink physical control channel time resource required for HARQ ACK/NACK transmission may be changed. In particular, because a certain period of time is taken to perform re-demodulation and/or re-decoding, the terminal may be unable to use the pre-scheduled uplink physical control channel time resource. In this case, a new uplink physical control channel time resource may be used instead of the pre-scheduled uplink physical control channel time resource. When there is sufficient time for the terminal to additionally perform re-demodulation and/or re-decoding, the pre-configured HARQ ACK/NACK transmission may be performed by using the pre-scheduled uplink physical control channel time resource without having to change the HARQ ACK/NACK transmission.

Figure 9:
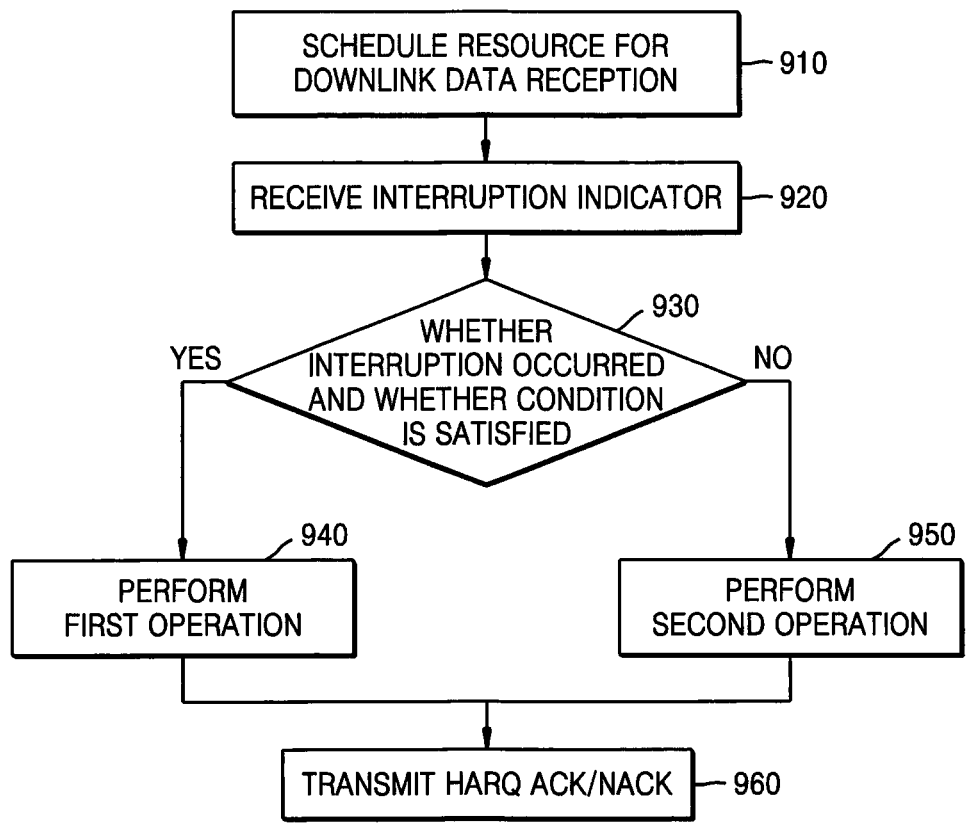
FIG. 9 is a flowchart of a method of transmitting and receiving control information of a terminal for transmitting first type data and second type data, according to an embodiment.

FIG. 9 is a flowchart of a communication method of a terminal, according to an embodiment.

The terminal may perform an HARQ ACK operation based on a size of an interrupted resource region or a time difference of a pre-configured downlink physical data resource region or an uplink physical control resource region, when an interruption indicator is received via a downlink control channel.

Referring to FIG. 9, in operation 910, the terminal is scheduled for a resource for downlink data reception from a base station. According to an embodiment, the terminal may be scheduled for a downlink physical data channel resource for receiving first type data via a downlink physical control channel.

Then, in operation 920, the terminal receives an interruption indicator. According to an embodiment, the terminal searches for and receives UE specific, UE group common, or common downlink physical control information including the interruption indicator. Such control information may be pre-configured via higher signaling. Also, the downlink physical control channel through which the control information is transmittable may be pre-configured.

In operation 930, the terminal determines whether interruption occurred and whether pre-configured condition is satisfied. According to an embodiment, the terminal may determine whether the entire or a part of a resource region for a pre-scheduled physical downlink data channel for the first type data is interrupted, based on the received interruption indicator.

Also, the terminal may determine whether at least one of following conditions is satisfied.

1. Whether time difference of physical channel resources (that is, one or combination of at least two of time intervals 640, 642, 644, 646, 648, 650, 652, 654, 656, 658, and 660 of FIG. 6) is equal to or greater than configured threshold value 2. Whether resource region for downlink physical data channel to which arbitrary code block configuring first type data is assigned is interrupted (or interrupted size)

3. Whether physical resource region to which demodulation reference signal (DMRS) for demodulation and/or decoding of first type data is assigned is interrupted For example, the terminal may determine that a pre-configured condition is satisfied when a time interval including one or a combination of at least two of the time intervals 640, 642, 644, 646, 648, 650, 652, 654, 656, 658, and 660 of FIG. 6 is equal to or greater than a certain threshold value, when an interrupted size of a resource region for a downlink physical data channel to which an arbitrary code block configuring the first type data is assigned is equal to or lower than a certain threshold value, when a physical resource region to which DMRS for demodulation and/or decoding of the first type data is not interrupted, or when an interrupted DMRS number is equal to or lower than a certain threshold value compared to the entire DMRS number.

When the terminal determines that the interruption occurred and the pre-configured condition is satisfied in operation 930, the terminal may perform a first operation in operation 940.

The first operation may include one or a combination of at least two of the following.

1. Perform (re-)demodulation/(re-)decoding on corresponding code block (or transport block) considering interrupted resource region 2. Perform re-demodulation and/or re-decoding on code block on which demodulation and/or decoding is pre-performed, considering interrupted resource region 3. Perform demodulation/decoding on code block on which demodulation and/or decoding is not pre-performed, considering interrupted resource region 4. Perform re-demodulation and/or re-decoding on code block on which demodulation and/or decoding is being performed, considering interrupted resource region 5. Perform re-demodulation and/or re-decoding on code blocks that are not interrupted or partially interrupted, after performing channel re-estimation with remaining DMRSs excluding interrupted DMRS For example, when (re-)demodulation/(re-)decoding is performed considering an interrupted resource region, the terminal may perform nulling on an interrupted resource region to 0 or a specific value and then perform (re-)demodulation/(re-) decoding on a physical data channel resource region to which a corresponding code block is assigned. Here, the nulling is an operation of configuring or initializing a specific resource region value to an arbitrary value instead of a value received by the terminal.

When the terminal determines that the interruption did not occur or the pre-configured condition is not satisfied in operation 930, the terminal may perform a second operation in operation 950. The second operation may include one or a combination of at least two of the following.

1. Not perform (or omit or stop) (re-)demodulation/(re-) decoding on corresponding code block (or transport block)

2. Not perform (or omit) re-demodulation and/or re-decoding on code block on which demodulation and/or decoding is pre-performed 3. Not perform (or omit) demodulation and/or decoding on code block on which demodulation and/or decoding is not pre-performed 4. Stop (or omit) demodulation and/or decoding on code block on which demodulation and/or decoding is being performed 5. Not perform (or omit) (re-)demodulation/(re-)decoding on code block group (or transport block) including interrupted code block According to an embodiment, the condition of operation 930 for each of the first and second operations performed in operations 940 and 950 may vary based on whether the transport block on which demodulation and/or decoding is to be performed is an initial transport block or a retransmission transport block. For example, the threshold value of the specific condition may vary.

Also, the not performing or omitting denotes an operation of storing a value immediately before the terminal performs demodulation and/or decoding, in a buffer. Here, the interrupted resource region may be stored in the buffer via nulling to 0 or a certain value, or the interrupted resource region may not be stored in the buffer and may be discarded.

In addition, when the most of or entire DMRSs are interrupted, the terminal is unable to perform demodulation and/or decoding on all pieces of pre-received data. Accordingly, when the terminal is performing demodulation and/or decoding, the corresponding operation may be stopped and a coded data value may be discarded from the buffer, and when the terminal already performed demodulation and/or decoding, the corresponding operation may not be re-performed and the coded data value may be discarded from the buffer.

In operation 960, the terminal performs an HARQ ACK/NACK transmission on the received first type data. In other words, after performing the first or second operation, the terminal may transmit a result of demodulation and/or decoding of the first type data to the base station.

Figure 10:
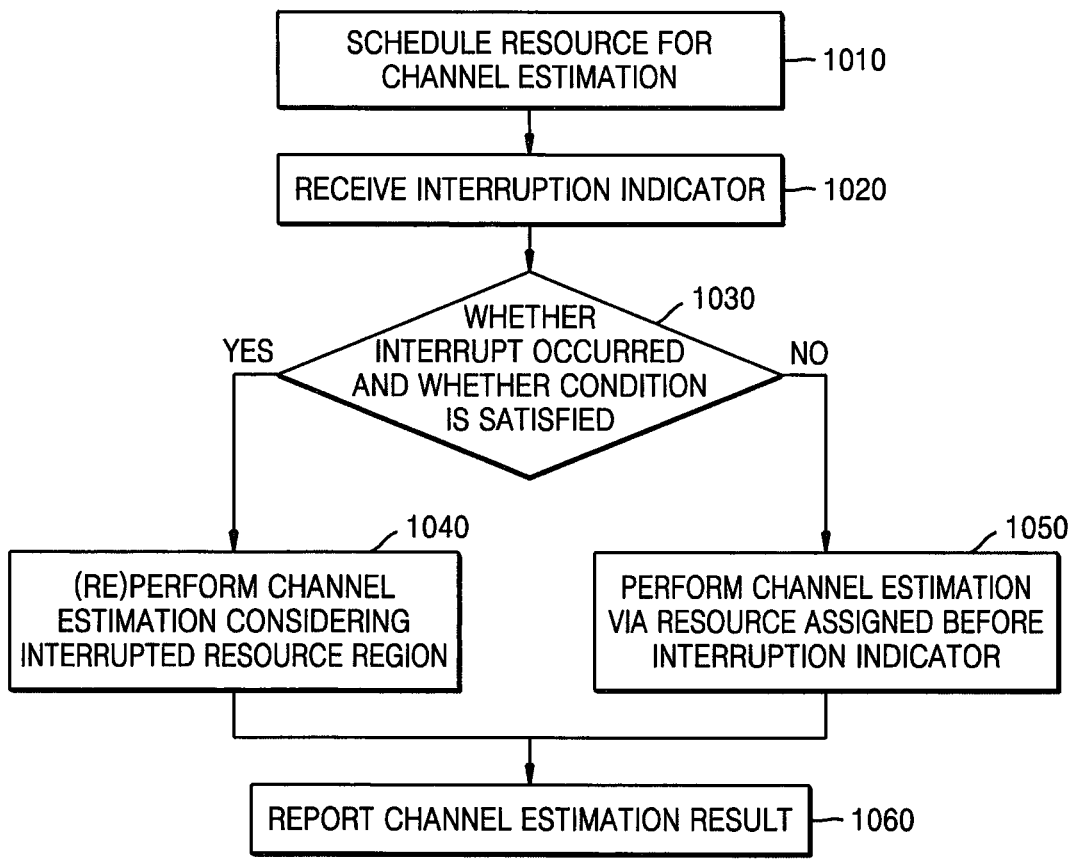
FIG. 10 is a flowchart of a method of transmitting and receiving control information of a terminal for channel estimation, according to an embodiment.

FIG. 10 is a flowchart of a method of transmitting and receiving control information of a terminal for channel estimation, according to an embodiment.

When a base station transmits UE specific or UE group common control information including an interruption indicator to one or at least two terminals, the base station may also transmit an indication to report a channel estimation result via a pre-assigned uplink control channel.

Referring to FIG. 10, in operation 1010, the terminal is scheduled for a resource for channel estimation from the base station. According to an embodiment, the terminal may be scheduled for the resource for the channel estimation via a UE specific or UE common downlink control channel. In particular, the terminal may be instructed for downlink channel estimation by being assigned with a resource for channel estimation.

Then, in operation 1020, the terminal receives an interruption indicator. According to an embodiment, the terminal searches for and receives UE specific, UE group common, or common downlink physical control information including the interruption indicator. Such control information may be pre-configured via higher signaling. Also, the downlink physical control channel through which the control information is transmittable may be pre-configured.

In operation 1030, the terminal determines whether interruption occurred and whether pre-configured condition is satisfied. According to an embodiment, the terminal may determine whether the pre-scheduled resource for the channel estimation is interrupted, based on the received interruption indicator. Also, the terminal may determine whether an interrupted size of the resource region for channel estimation satisfies a pre-configured condition.

For example, the terminal may determine that the pre-configured condition is satisfied when the interrupted size of the resource region for channel estimation is equal to or lower than a certain threshold value.

When the terminal determines that the interruption occurred and the pre-configured condition is satisfied in operation 1030, the terminal (re)performs channel estimation considering the interrupted resource region in operation 1040.

When the terminal determines that the interruption did not occur or the pre-configured condition is not satisfied in operation 1030, the terminal performs channel estimation via a resource assigned before the interruption indicator in operation 1050. In other words, the terminal may not reflect the interrupted resource region to current channel estimation.

According to another embodiment, the terminal may generate a channel estimation result considering only channel estimation resources remaining by excluding the interrupted resource region during the channel estimation.

In operation 1060, the terminal reports the channel estimation result. According to an embodiment, the terminal may report the base station of the channel estimation result performed considering the interrupted resource region or the channel estimation result performed via the resource assigned before the interruption indicator, based on whether the interruption occurred and whether the pre-configured condition is satisfied.

According to an embodiment, the reporting of the channel estimation result may include an operation of not transmitting a downlink reference signal channel estimation result to the base station. For example, when the terminal is requested for aperiodic channel estimation from the base station, a correct channel estimation result may be reported when a corresponding channel estimation resource is interrupted to the extent that it is unable to be reported (for example, fully interrupted). Accordingly, in this case, a downlink reference signal channel estimation result may not be transmitted to the base station. In other words, even when the terminal is assigned with an uplink physical channel estimation report resource together with a resource for channel estimation from the base station, the terminal may not report the channel estimation result via the assigned uplink physical channel estimation report resource.

Even when the terminal is requested for periodic channel estimation, the terminal may not transmit the channel estimation result to the base station regarding at least a channel estimation resource mapped to the interrupted resource. However, in this case as well, a downlink reference signal channel estimation result may be transmitted to the base station considering a pre-measured resource and an uninterrupted resource remaining after excluding the interrupted partial resource region.

Figure 11:
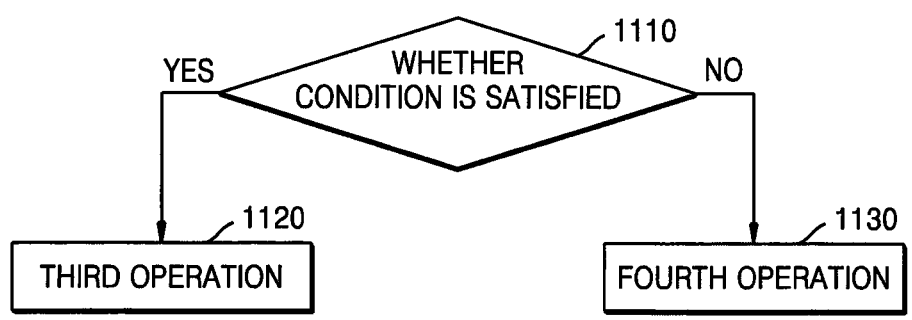
FIG. 11 is a flowchart of a method of transmitting and receiving control information of a terminal for changing an HARQ ACK/NACK result report resource, according to an embodiment.

FIG. 11 is a flowchart of a method of transmitting and receiving control information of a terminal for changing an HARQ ACK/NACK result report resource, according to an embodiment.

When the terminal receives UE specific or group common control information including an interruption indicator, it is possible to change an HARQ ACK/NACK result report resource regarding first type data according to interruption of a pre-received resource for the first type data. In particular, when it is determined that interruption occurred via the interruption indicator, the terminal requires additional time to perform re-demodulation and/or re-decoding based on the interruption indicator and generate an HARQ ACK/NACK result. Accordingly, the terminal may separately require another time resource for an HARQ ACK/NACK result report instead of a pre-configured time resource.

Referring to FIG. 11, in operation 1110, the terminal determines whether a pre-configured condition is satisfied. According to an embodiment, the terminal may determine whether at least one of following conditions is satisfied.

1. Whether at least part of pre-scheduled downlink data physical channel resource region is interrupted
2. Whether part of physical channel resource region to which at least partial code block(s) are assigned is interrupted
3. Whether interval between time when interruption indicator is received and time of HARQ ACK/NACK result report is equal to or lower than configured threshold value
4. Whether at least part of physical channel resource region to which at least some of code block(s) among code blocks in which decoding is completed currently are assigned is interrupted For example, the terminal may determine that the pre-configured condition is satisfied when at least a part of a pre-scheduled downlink data physical channel resource region is interrupted, when a part of physical channel resource region to which at least partial code block(s) are assigned is interrupted, when an interval between a time when the interruption indicator is received and a time of HARQ ACK/NACK result report is equal to or lower than a configured threshold value, or when at least a part of physical channel resource region to which at least some code block(s) among code blocks in which decoding is completed currently are assigned is interrupted.

Also, the terminal may determine that the pre-configured condition is not satisfied when the pre-scheduled downlink data physical channel resource region is not entirely interrupted, when there is no code block of which only a part is interrupted among physical channel resource region to which each code block is assigned (for example, when the physical channel resource to which each code block is assigned is interrupted entirely (or by a certain ratio) or is not interrupted entirely), when the interval between the time when the interruption indicator is received and the time of HARQ ACK/NACK result report is equal to or greater than a certain threshold value, when a physical channel resource region to which at least some of code block(s) among the code blocks in which decoding is completed currently are assigned is interrupted by a certain threshold value, or when the physical channel resource region to which at least some of code block(s) among the code blocks in which decoding is completed currently are assigned is not interrupted.

When the terminal determines that the pre-configured condition is satisfied in operation 1110, the terminal may perform a third operation in operation 1120.

The third operation may include one or a combination of at least two of the following.

1. Change pre-configured HARQ ACK/NACK result report resource corresponding to downlink data information pre-received or being received to new HARQ ACK/NACK result report resource
2. Determine whether result of performing (re-)demodulation/(re-)decoding on downlink data using interruption information is reportable by using pre-configured HARQ ACK/NACK result report resource corresponding to downlink data information pre-received or being received, and use pre-configured HARQ ACK/NACK result report resource or change pre-configured HARQ ACK/NACK result report resource to new HARQ ACK/NACK result report resource based on result of determining.

For example, when it is determined that the pre-configured condition is satisfied, the terminal may change a pre-configured HARQ ACK/NACK result report resource to a new HARQ ACK/NACK result report resource. Also, even when it is determined that the pre-configured condition is satisfied, the terminal may use the pre-configured HARQ ACK/NACK result report resource as it is, considering a time taken to perform (re-)demodulation/(re-)decoding on downlink data based on the interruption indicator or a degree of downlink data (for example, a code block) being interrupted. In particular, when the time taken to perform (re-)demodulation/(re-)decoding on the downlink data based on the interruption indicator is short or the degree of downlink data (for example, the code block) being interrupted is not large, the terminal may determine to use the pre-configured HARQ ACK/NACK result report resource. Also, when the time taken to perform (re-)demodulation/(re-)decoding on the downlink data based on the interruption indicator is long or the degree of downlink data (for example the code block) being interrupted is large, the terminal may change the pre-configured HARQ ACK/NACK result report resource to the new HARQ ACK/NACK result report resource.

According to an embodiment, the new HARQ ACK/NACK result report resource may be determined according to an implicit specific rule between the base station and the terminal or may be explicitly notified to the terminal after the base station configures the new HARQ ACK/NACK result report resource via higher signaling or L1 signaling.

When the terminal determines that the pre-configured condition is not satisfied in operation 1110, the terminal may perform a fourth operation in operation 1130.

The fourth operation is as follows.

1. Generate HARQ ACK/NACK result by using (pre-configured) HARQ ACK/NACK result report resource corresponding to downlink data information pre-received or being received.

For example, when it is determined that the pre-configured condition is not satisfied, the terminal may use the pre-configured HAQR ACK/NACK result report resource as it is.

Figure 12:
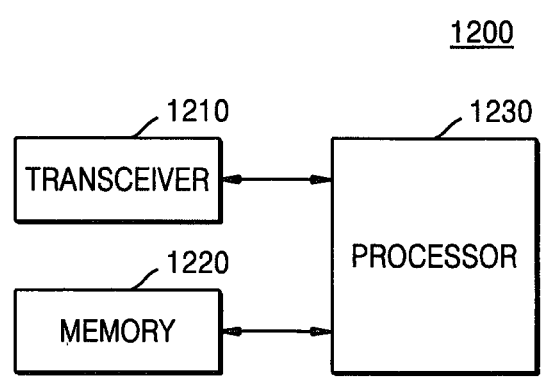
FIG. 12 is a block diagram showing a structure of a terminal, according to an embodiment.

FIG. 12 is a block diagram showing a structure of a terminal, according to an embodiment.

Referring to the FIG. 12, a terminal 1200 may include a transceiver 1210, a memory 1220, and a processor 1230. The transceiver 1210, the memory 1220, and the processor 1230 of the terminal 1200 may operate according to a communication method of the terminal 1200. However, not all of the illustrated components are essential. For example, the terminal 1200 may be implemented by more or less components than those described above. In addition, the transceiver 1210, the memory 1220, and the processor 1230 may be implemented as a single chip.

The transceiver 1210 may transmit or receive a signal to or from a base station. Here, the signal may include control information and data. In this regard, the transceiver 1210 may include a RF transmitter for up-converting and amplifying a frequency of a transmitted signal, and a RF receiver for amplifying low-noise and down-converting a frequency of a received signal. However, this is only an embodiment of the transceiver 1210 and components of the transceiver 1210 are not limited to the RF transmitter and the RF receiver.

Also, the transceiver 1210 may receive and output, to the processor 1230, a signal through a wireless channel, and transmit a signal output from the processor 1230 through the wireless channel.

The memory 1220 may store a program and data required for operations of the terminal 1200. Also, the memory 1220 may store control information or data included in a signal obtained by the terminal 1200. The memory 1220 may be a storage medium, such as read-only memory (ROM), random access memory (RAM), a hard disk, a CD-ROM, and a DVD, or a combination of storage media.

The processor 1230 may control a series of processes such that the terminal 1200 operates as described above. According to an embodiment, the processor 1230 may control the transceiver 1210 to receive a signal including transmission timing information of a second signal from the base station and analyze transmission timing of the second signal. Then, the processor 1230 may control the transceiver 1210 to transmit the second signal at the analyzed transmission timing. Also, the processor 1230 may control the transceiver 1210 to receive first type data, second type data assigned to at least a part of a resource region assigned to the first type data, and an interruption indicator, and perform an HARQ ACK/NACK transmission based on the interruption indicator.

Figure 13:
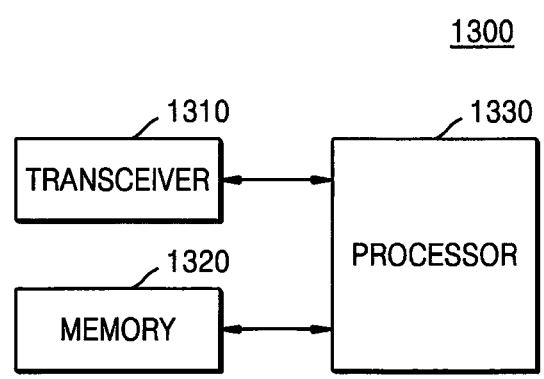
FIG. 13 is a block diagram showing a structure of a base station, according to an embodiment.

FIG. 13 is a block diagram showing a structure of a base station, according to an embodiment.

Referring to the FIG. 13, a base station 1300 may include a transceiver 1310, a memory 1320, and a processor 1330. The transceiver 1310, the memory 1320, and the processor 1330 of the base station 1300 may operate according to a communication method of the base station 1300. However, not all of the illustrated components are essential. For example, the base station 1300 may be implemented by more or less components than those described above. In addition, the transceiver 1310, the memory 1320, and the processor 1330 may be implemented as a single chip.

The transceiver 1310 may transmit or receive a signal to or from a terminal. Here, the signal may include control information and data. In this regard, the transceiver 1310 may include a RF transmitter for up-converting and amplifying a frequency of a transmitted signal, and a RF receiver for amplifying low-noise and down-converting a frequency of a received signal. However, this is only an embodiment of the transceiver 1310 and components of the transceiver 1310 are not limited to the RF transmitter and the RF receiver.

Also, the transceiver 1310 may receive and output, to the processor 1330, a signal through a wireless channel, and transmit a signal output from the processor 1330 through the wireless channel.

The memory 1320 may store a program and data required for operations of the base station 1300. Also, the memory 1320 may store control information or data included in a signal obtained by the base station 1300. The memory 1320 may be a storage medium, such as ROM, RAM, a hard disk, a CD-ROM, and a DVD, or a combination of storage media.

The processor 1330 may control a series of processes such that the base station 1300 operates as described above. According to an embodiment, the processor 1330 may determine a second signal transmission timing and generate second signal transmission timing information to be transmitted to the terminal 1200. Then, the processor 1330 may transmit the timing information to the terminal 1200 and control the transceiver 1310 to receive a second signal at a corresponding timing. Also, the processor 1330 may generate downlink control information (DCI) including the second signal transmission timing information. In this case, the DCI may indicate the second signal transmission timing information. Also, the processor 1330 may transmit, to the terminal, first type data, second type data assigned to at least a part of resource region assigned to the first type data, and an interruption indicator, and receive HARQ ACK/NACK from the terminal.

Meanwhile, the embodiments of the disclosure described with reference to the present specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments may be combined with each other as required. For example, a base station and a terminal may operate with some of the embodiments combined together. Also, the above embodiments are suggested based on an NR system, but other modifications based on the technical aspects of the embodiments may be possible for other systems, such as FDD or TDD LTE systems.

In addition, the present specification and drawings disclose exemplary embodiments of the present disclosure, and although specific terms are used, these are merely used in a general sense to easily explain the technical contents of the present disclosure and to help understanding of the present disclosure, and not intended to limit the scope of the present disclosure. It will be apparent to one of ordinary skill in the art that other modifications based on the technical idea of the present disclosure may be carried out in addition to the embodiments disclosed herein.

The invention claimed is:

1. A method, performed by a terminal, of transmitting and receiving control information in a wireless communication system, the method comprising:
receiving first type data in a scheduled downlink physical data channel resource region;
receiving second type data assigned to at least a part of the resource region assigned to the first type data;
receiving an interruption indicator for verifying the second type data is received; and
performing a hybrid automatic repeat request (HARQ) acknowledgement (ACK)/negative ACK (NACK) transmission regarding the first type data, based on the interruption indicator in units of at least one code block, when a resource to which at least one code block included in the first service type data is assigned is interrupted by a predetermined ratio.

2. The method of claim 1, wherein performing the HARQ ACK/NACK transmission comprises determining the HARQ ACK/NACK transmission regarding the first type data based on a reception time of the interruption indicator, wherein the reception time of the interruption indicator comprises at least one of a time when a resource region including the interruption indicator starts to be received and a time when reception of the interruption indicator is ended.

3. The method of claim 2, wherein performing the HARQ ACK/NACK transmission further comprises determining the HARQ ACK/NACK transmission regarding the first type data based on at least one of a reception time of the first type data, a reception time of the second type data, and a transmission time of HARQ ACK/NACK,
wherein the reception time of the first type data comprises at least one of a time when a resource region to which the first type data is assigned starts to be received and a time when reception is ended,
the reception time of the second type data comprises at least one of a time when a resource region to which the second type data is assigned starts to be received and a time when reception is ended, and the transmission time of the HARQ ACK/NACK comprises at least one of a time when a resource region to which the HARQ ACK/NACK is assigned starts to be transmitted and a time when transmission is ended.

4. The method of claim 3, wherein performing the HARQ ACK/NACK transmission further comprises determining the HARQ ACK/NACK transmission regarding the first type data based on a time difference between the reception time of the interruption indicator and at least one of the reception time of the first type data, the reception time of the second type data, and the transmission time of the HARQ ACK/NACK.

5. The method of claim 1, wherein the reception time of the first type data comprises at least one of a time when a resource to which the at least one code block is assigned starts to be received and a time when reception is ended.

6. The method of claim 1, wherein performing the HARQ ACK/NACK transmission comprises changing a pre-configured HARQ ACK/NACK transmission resource to a new HARQ ACK/NACK transmission resource.

7. The method of claim 6, wherein performing the HARQ ACK/NACK transmission further comprises:
determining whether an interruption regarding the first type data is generated, based on the interruption indicator; and
when the interruption regarding the first type data is generated, determining to change the pre-configured HARQ ACK/NACK transmission resource to the new HARQ ACK/NACK transmission resource.

8. The method of claim 6, wherein performing the HARQ ACK/NACK transmission further comprises determining to change the pre-configured HARQ ACK/NACK transmission resource to the new HARQ ACK/NACK transmission resource at least one of when a time difference between a reception time of the interruption indicator and at least one of a reception time of the first type data, a reception time of the second type data, and a transmission time of HARQ ACK/NACK is equal to or greater than a threshold value and when a resource to which a demodulation reference signal (DMRS) for demodulation of the first type data is assigned is interrupted.

9. The method of claim 6, wherein the new HARQ ACK/NACK transmission resource comprises a time resource different from the pre-configured HARQ ACK/NACK transmission resource.

10. A terminal for transmitting and receiving control information in a wireless communication system, the terminal comprising:
a communicator configured to communicate with a base station; and
a processor configured to receive first type data in a scheduled downlink physical data channel resource region, receive second type data assigned to at least a part of a resource region assigned to the first type data, receive an interruption indicator for verifying the second type data is received, and perform a hybrid automatic repeat request (HARQ) acknowledgement (ACK)/negative ACK (NACK) transmission regarding the first type data based on the interruption indicator in units of at least one code block, when a resource to which at least one code block included in the first service type data is assigned is interrupted by a predetermined ratio.

11. The terminal of claim 10, wherein the processor is further configured to determine the HARQ ACK/NACK transmission regarding the first type data based on a reception time of the interruption indicator,
wherein the reception time of the interruption indicator comprises at least one of a time when a resource region including the interruption indicator starts to be received and a time when reception of the interruption indicator is ended.

12. The terminal of claim 11, wherein the processor is further configured to determine the HARQ ACK/NACK transmission regarding the first type data based on at least one of a reception time of the first type data, a reception time of the second type data, and a transmission time of HARQ ACK/NACK,
wherein the reception time of the first type data comprises at least one of a time when a resource region to which the first type data is assigned starts to be received and a time when reception is ended,
the reception time of the second type data comprises at least one of a time when a resource region to which the second type data is assigned starts to be received and a time when reception is ended, and
the transmission time of the HARQ ACK/NACK comprises at least one of a time when a resource region to which the HARQ ACK/NACK is assigned starts to be transmitted and a time when transmission is ended.

13. The terminal of claim 12, wherein the processor is further configured to determine the HARQ ACK/NACK transmission regarding the first type data based on a time difference between the reception time of the interruption indicator and at least one of the reception time of the first type data, the reception time of the second type data, and the transmission time of the HARQ ACK/NACK.

14. The terminal of claim 10, wherein the reception time of the first type data comprises at least one of a time when a resource to which the at least one code block is assigned starts to be received and a time when reception is ended.

15. The terminal of claim 10, wherein performing the HARQ ACK/NACK transmission comprises changing a pre-configured HARQ ACK/NACK transmission resource to a new HARQ ACK/NACK transmission resource.

16. The terminal of claim 15, wherein the processor is further configured to determine whether an interruption regarding the first type data is generated, based on the interruption indicator; and
when the interruption regarding the first type data is generated, determine to change the pre-configured HARQ ACK/NACK transmission resource to the new HARQ ACK/NACK transmission resource.

17. The terminal of claim 15, wherein the processor is further configured to determine to change the pre-configured HARQ ACK/NACK transmission resource to the new HARQ ACK/NACK transmission resource at least one of when a time difference between a reception time of the interruption indicator and at least one of a reception time of the first type data, a reception time of the second type data, and a transmission time of HARQ ACK/NACK is equal to or greater than a threshold value and when a resource to which a demodulation reference signal (DMRS) for demodulation of the first type data is assigned is interrupted.

18. The terminal of claim 15, wherein the new HARQ ACK/NACK transmission resource comprises a time resource different from the pre-configured HARQ ACK/NACK transmission resource.

* * * * *